United States Patent
Chen

(10) Patent No.: US 10,766,587 B2
(45) Date of Patent: *Sep. 8, 2020

(54) HUMAN POWERED WATERCRAFT OR LAND VEHICLE

(71) Applicant: Jack Chen, Coto de Caza, CA (US)

(72) Inventor: Jack Chen, Coto de Caza, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/539,270

(22) Filed: Aug. 13, 2019

(65) Prior Publication Data

US 2019/0359304 A1 Nov. 28, 2019

Related U.S. Application Data

(63) Continuation of application No. 16/164,718, filed on Oct. 18, 2018, now Pat. No. 10,442,514, which is a continuation-in-part of application No. PCT/US2017/028160, filed on Apr. 18, 2017.

(60) Provisional application No. 62/325,009, filed on Apr. 20, 2016.

(51) Int. Cl.
| | |
|---|---|
| *B63H 16/18* | (2006.01) |
| *B60F 3/00* | (2006.01) |
| *B63H 23/04* | (2006.01) |
| *B63H 23/02* | (2006.01) |

(52) U.S. Cl.
CPC .............. *B63H 16/18* (2013.01); *B60F 3/00* (2013.01); *B60F 3/0007* (2013.01); *B63H 23/04* (2013.01); *B63H 2016/185* (2013.01); *B63H 2023/0233* (2013.01)

(58) Field of Classification Search
CPC .......... B60F 3/0007; B60F 3/00; B63H 16/18; B63H 23/04
See application file for complete search history.

(56) References Cited

U.S. PATENT DOCUMENTS

| | | | |
|---|---|---|---|
| 2,378,634 A | 6/1945 | Hussey |
| 3,984,129 A | 10/1976 | Hege |
| 4,585,244 A | 4/1986 | Testa, Sr. |
| 6,446,995 B1 | 9/2002 | Xu |

(Continued)

FOREIGN PATENT DOCUMENTS

| | | |
|---|---|---|
| CN | 2039298 U | 6/1989 |
| CN | 2565742 Y | 8/2003 |

(Continued)

OTHER PUBLICATIONS

US 9,409,620 B1, 08/2016, Perkins (withdrawn)

*Primary Examiner* — Stephen P Avila
(74) *Attorney, Agent, or Firm* — Klein, O'Neill & Singh, LLP

(57) ABSTRACT

A human powered watercraft or land vehicle is described herein. A watercraft or land vehicle may have two pedals that reciprocated are in a linear or slightly curved trajectory but not a circular motion. As the two pedals are reciprocated, an output shaft is rotated in either a clockwise or counter-clockwise direction when the left pedal is pushed forward or when the right pedal is pushed forward. The output shaft may be connected to a propeller of a watercraft or a land vehicle so as to propel the watercraft or land vehicle forward. The output shaft may receive rotational input through two gears mounted to the output shaft with one-way bearings that enable the output shaft to rotate in the same direction regardless of whether the left pedal or the right pedal is being pushed forward.

18 Claims, 21 Drawing Sheets

(56) References Cited

U.S. PATENT DOCUMENTS

| | | | |
|---|---|---|---|
| 6,478,323 | B2 | 11/2002 | Chang |
| 7,914,029 | B2 | 3/2011 | Miller |
| 9,102,197 | B2 | 8/2015 | Gerhardt |
| 10,442,514 | B2 | 10/2019 | Chen |

FOREIGN PATENT DOCUMENTS

| | | |
|---|---|---|
| CN | 201161687 Y | 12/2008 |
| CN | 102373601 A | 3/2012 |
| CN | 205360502 U | 7/2016 |
| KR | 20020022225 A | 3/2002 |
| RU | 2048993 C1 | 11/1995 |
| RU | 2068374 C1 | 10/1996 |

HUMAN POWERED WATERCRAFT OR LAND VEHICLE

CROSS-REFERENCE TO RELATED APPLICATIONS

This application is a continuation application of U.S. patent application Ser. No. 16/164,718, filed on Oct. 18, 2018 which is a continuation in part application of PCT Application Number PCT/US2017/028160, filed on Apr. 18, 2017 which is an international application and claims priority to U.S. Provisional Application No. 62/325,009, filed on Apr. 20, 2016, the entire contents of which are expressly incorporated herein by reference.

STATEMENT RE:FEDERALLY SPONSORED RESEARCH/DEVELOPMENT

Not Applicable

BACKGROUND

The various embodiments an aspect described herein relate to a device for powering a small human powered watercraft or land vehicle through reciprocal pedal motion.

Small human powered watercraft is powered by a user peddling his or her feet like a person pedals a bicycle. The user may sit down and have his or her feet oriented generally horizontal to an upper surface of the water. As a user pedals, the user's feet must be lifted up in order to complete the circular peddling motion. Unfortunately, the user will become tired from having to lift his or her feet up. Other deficiencies in the prior art also exist.

Accordingly, there is a need in the art for an improved device for propelling a small human powered watercraft or land vehicle.

BRIEF SUMMARY

The various aspects and embodiments described herein address the deficiencies identified above, discussed below and those that are known in the art.

The device may be mounted to a small human powered watercraft or land vehicle. The device may be used to rotate an output shaft when the user pedals left and right foot pedals reciprocally in a linear fashion or through a partial circular motion, not 360° in a circular motion. When the left pedal is pushed forward, the output shaft is rotated in a first direction. Additionally, when the right pedal is pushed forward, the output shaft is also rotated in the first direction. Two one-way bearings in the device allow a user to impart rotational motion onto the output shaft in the same direction during both the forward stroke of the left pedal and the forward stroke of the right pedal. The device may also be mounted to a small human powered land vehicle in order to rotate a wheel of the land vehicle to move the land vehicle forward.

More particularly, a human powered vehicle operative to rotate a propeller or rotate a wheel by reciprocating left and right pedals is disclosed. The vehicle may comprise the following components: a frame; a left pedal operative to reciprocate linearly or through a partial curved trajectory; a right pedal operative to reciprocate linearly or through a partial curved trajectory; a left rack attached to the left pedal so that reciprocating the left pedal reciprocates the left rack; a right rack attached to the right pedal so that reciprocating the right pedal reciprocates the right rack; a left shaft; a right shaft; a left pinion engaged to the left rack so that the left pinion reciprocates with the left rack, the left pinion attached to the left shaft; a right pinion engaged to the right rack so that the right pinion reciprocates with the right rack, the right pinion attached to the right shaft; a left beveled gear attached to the left shaft; a right beveled gear attached to the right shaft; a main shaft; an upper one way bearing; an upper beveled gear attached to the main shaft with the upper one way bearing; a lower one way bearing; a lower beveled gear attached to the main shaft with the lower one way bearing; a transmission box attached to the frame, the transmission box having an input shaft and an output shaft, the input shaft operative to rotate the output shaft, the main shaft being coupled to the input shaft; and the propeller or the wheel attached to the output shaft.

The upper and lower one way bearings may be attached to the main shaft engage the shaft in the same rotational direction and freely rotate in the opposite rotational direction.

The propeller and not the wheel may be attached to the output shaft. Alternatively, the wheel and not the propeller may be attached to the output shaft.

The linear reciprocation of the left and right pedals may be straight or curved and is not circular 360°.

The left and right racks may be straight.

The left and right racks may be rotationally attached to the frame.

In another aspect, a human powered vehicle operative to spin a propeller or rotate a wheel by linearly reciprocating left and right pedals is disclosed. The vehicle may comprise the following components: a frame of the human powered vehicle; a main shaft; a left pedal operative to reciprocate linearly or through a partial curved trajectory and impart rotation to the main shaft; a right pedal operative to reciprocate linearly or through a partial curved trajectory and impart rotation to the main shaft; an upper one way bearing; an upper transmission device attached to the main shaft with the upper one way bearing; a lower one way bearing; a lower transmission device attached to the main shaft with the lower one way bearing; a transmission box attached to the frame, the transmission box having an input shaft and an output shaft, the input shaft operative to rotate the output shaft, the main shaft being coupled to the input shaft; and the propeller or the wheel attached to the output shaft of the transmission box.

The frame of the vehicle may be a land vehicle frame. Alternatively, the frame of the vehicle may be a human powered watercraft frame.

In another aspect, a method for propelling a small human powered vehicle is disclosed. The method may comprise the steps of pushing a left pedal forward but not in a circular motion to rotate a first bearing or pulley attached to an output shaft in a first rotational direction; actively engaging the output shaft with a first one way bearing which is used to mount the first bearing or pulley to the output shaft, the first one way bearing allowing for free rotation in a second opposite rotational direction but not in the first rotational direction; rotating the output shaft through the first bearing and the first one way bearing during the pushing the left pedal step; pushing a right pedal forward but not in a circular motion to rotate a second bearing or pulley attached to the output shaft in the first rotational direction; actively engaging the output shaft with a second one way bearing which is used to mount the second bearing or pulley to the output shaft, the second one way bearing allowing for free rotation in the second opposite rotational direction but not in the first rotational direction; rotating the output shaft through the second bearing and the second one way bearing during the pushing the right pedal step; imparting rotational energy to a propeller or a wheel when the left pedal is pushed forward and when the right pedal is pushed forward.

The human powered vehicle may be a watercraft and the propeller may be rotated upon pushing the left and right pedals forward. Alternatively, the human powered vehicle may be a land vehicle and the wheel may be rotated upon pushing the left and right pedals forward.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
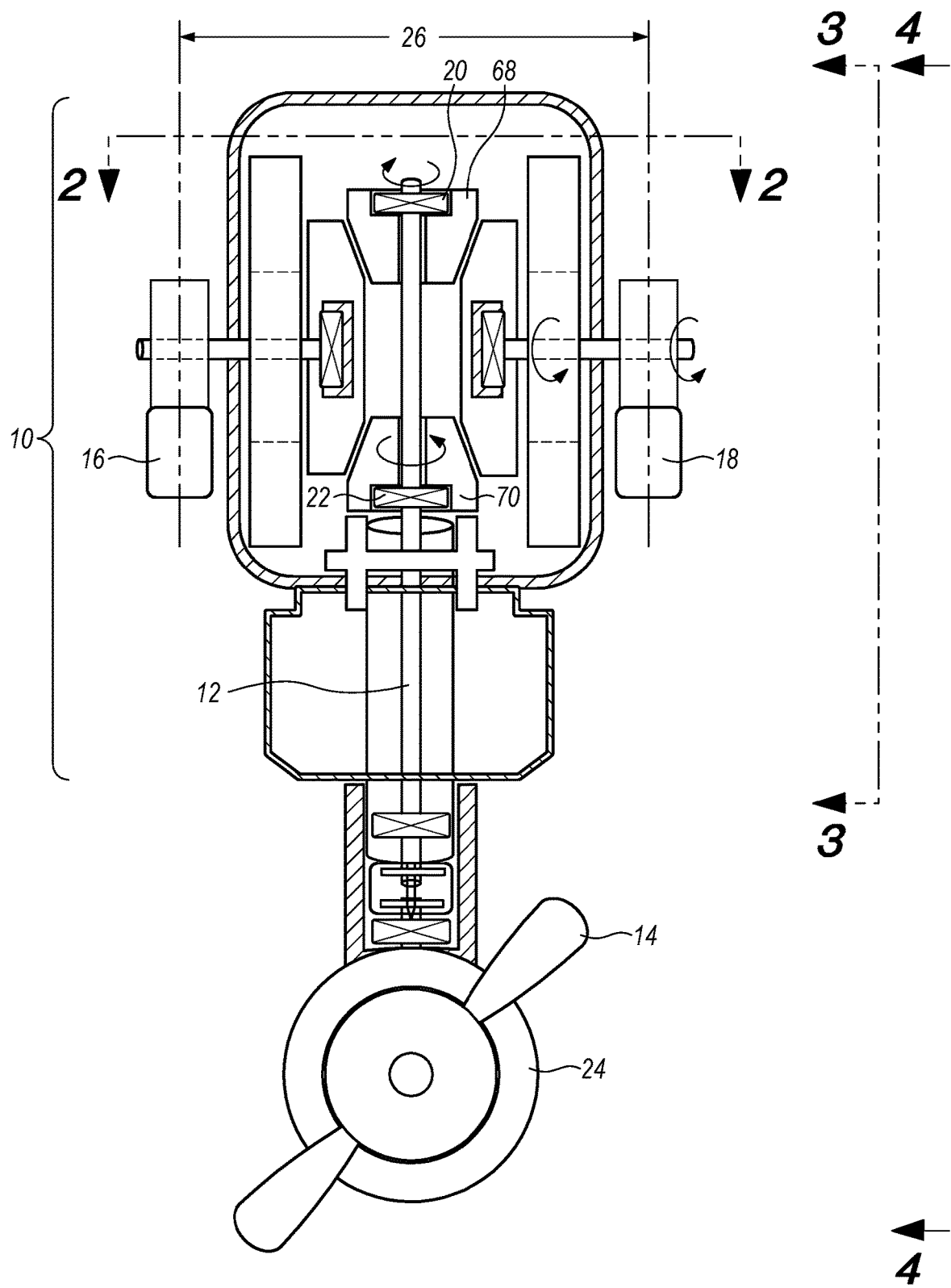
FIG. 1 is a partial cross-sectional front view of a device for propelling a small human powered watercraft or land vehicle.

Referring now to the drawings, a device 10 for rotating an output shaft 12 to power either a propeller 14 of a small human powered watercraft or a wheel of a small human powered land vehicle is shown. The device 10 allows a person to reciprocally push left and right foot pedals 16, 18. The push stroke for both the left and right foot pedals 16, 18 rotates the output shaft 12 in the same direction so that the propeller 14 can push the small human powered watercraft forward or rotate the wheel of the small human powered land vehicle and push the vehicle forward. Pushing the left pedal 16 does not rotate the output shaft 12 in the opposite direction compared to when the right pedal 18 is pushed. This is accomplished through first and second one-way bearings 20, 22 which are actively engaged to the output shaft 12 to provide rotation in the same direction to the output shaft 12. Either the first one-way bearing 20 is actively engaged to provide rotation to the output shaft 12 when the left pedal 16 is pushed forward and the second one-way bearing 22 is actively engaged to provide rotation to the output shaft 12 on the right pedal 18 is pushed forward, or alternatively, the first one-way bearing 20 is actively engaged to provide rotation to the output shaft 12 when the right pedal 18 is pushed forward and the second one-way bearing 22 is actively engaged to provide rotation when the left pedal 16 is pushed forward. The output shaft 12 may be connected to a transmission box 24 that converts the rotational movement of the output shaft 12 into usable energy. For example, as shown in FIG. 1, the propeller 14 may be attached to the transmission box 24 and receive the rotational energy of the output shaft 12 so that the propeller 14 is rotated and the small human powered watercraft is moved forward or in the direction of the propeller 14. Alternatively, a wheel of a small human powered land vehicle may be attached to a transmission box which is attached to the output shaft 12 to receive the rotational energy of the output shaft 12 so that the wheel is rotated and the small human powered land vehicle is moved forward or in the rotational direction of the wheel. For example, the device 10a may be mounted to a frame of a bicycle or a one or more wheeled human powered land vehicle. The pedals of the device may be aligned so that a user can reciprocate the pedals up and down with his/her feet. The pedals 16a, 18a when traversed up and down rotate an output shaft in the device 10a. The output shaft of the device 10a is connected to a transmission box 24a. An output shaft of the transmission box 24a may be connected to a wheel of the wheeled human powered land vehicle to rotate the wheel and propel the land vehicle forward.

The small human powered watercraft may be a canoe, one or two manned pedal boat or pedal kayak, or the like. The small human powered vehicle may be a bicycle, an elliptical bicycle, or the like.

Figure 2:
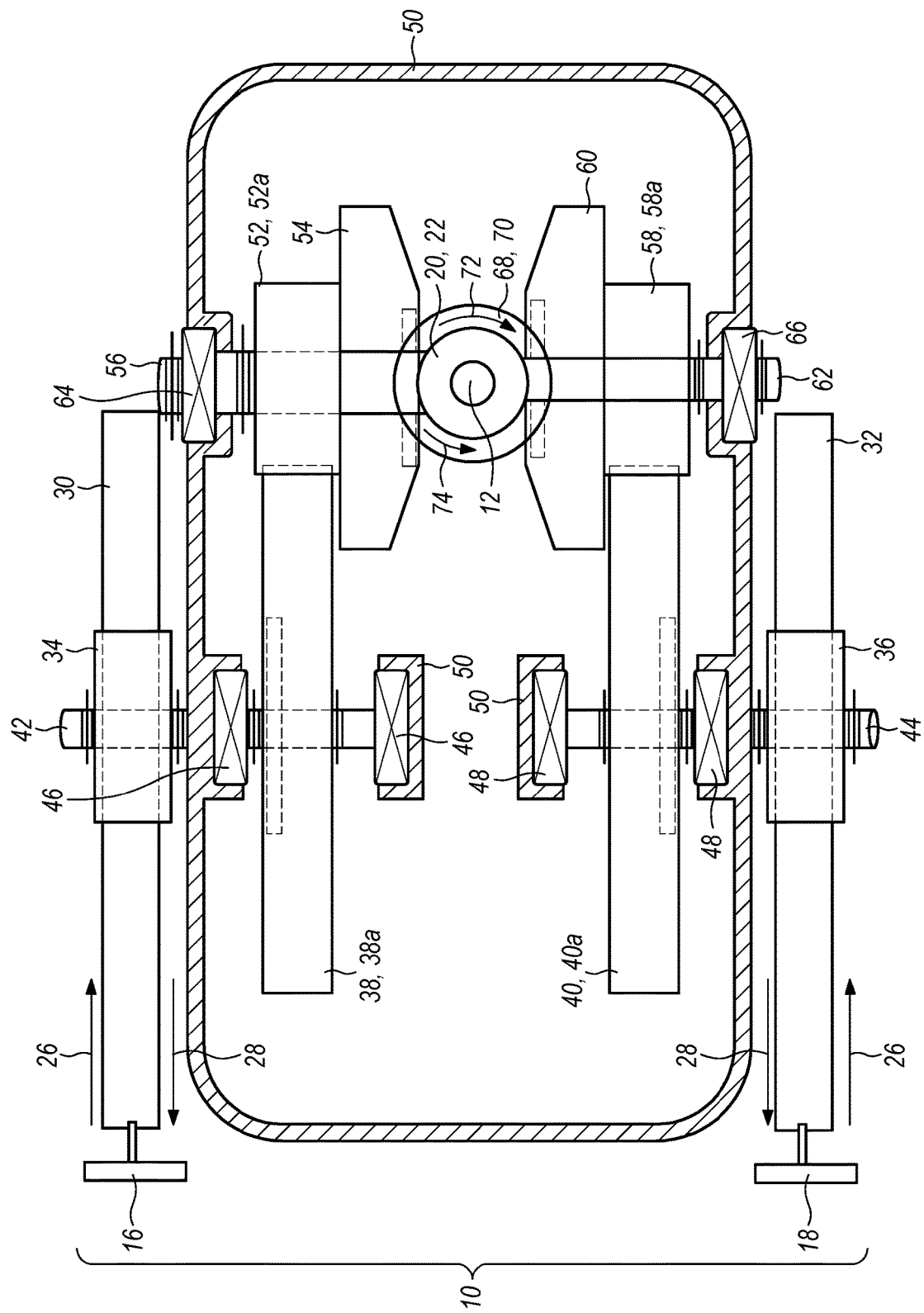
FIG. 2 is a cross-sectional top view of the device shown in FIG. 1.
Figure 3:
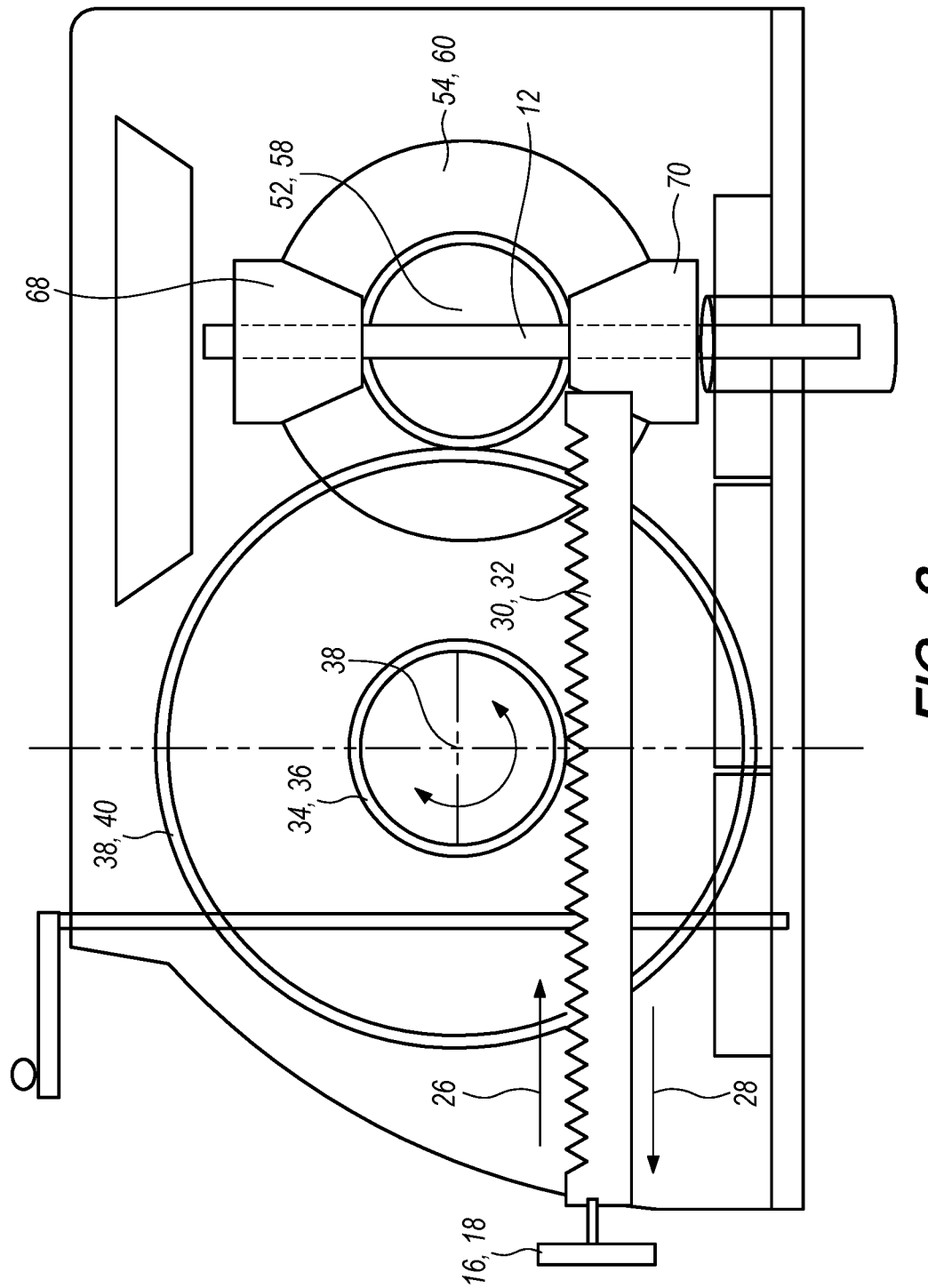
FIG. 3 is a cross-sectional right side view of the device shown in FIG. 1.

Referring now to FIG. 1, a front cross-sectional view of the device 10 and gearbox 24 which may be utilized on a small human powered watercraft is shown. The device 10 may have left and right pedals 16, 18. The left and right pedals 16, 18 may be spaced apart by a distance 25 that is about equal to or slightly more than shoulder width apart. For example, the distance 26 may be between 10 inches to 30 inches and is preferably between 17 to 25 inches. As shown in FIGS. 2 and 3, the left and right pedals 16, 18 may be pushed in the direction of 26. When the left pedal 16 is pushed forward in the direction 26, the right pedal 18 is traversed backward in the direction 28 through a series of gears in the device 10. With the right pedal 18 traversed backward fully, the right pedal 18 may now be pushed forward in the direction 26. When the right pedal 18 is pushed in the direction 26, the left pedal 16 is pushed backward fully in the direction 28 through a series of gears in the device 10. Each time the user pushes either one of the left or right pedals 16, 18, the output shaft 12 of the device 10 is also rotated in the same rotational direction so that through the transmission box 24, the propeller 14 or wheel is rotated in the same direction as well. Although the description describes the pedals 16, 18 as being fully depressed forward or fully traversed backward before the other pedal 16, 18 is depressed forward, the device 10 still operates to rotate the output shaft 12 in the same direction even if the stroke of the pedals 16, 18 is cut short.

The left and right pedals 16, 18 may be attached the left and right racks 30, 32. Left and right racks may have teeth that receive first gears 34, 36. As the racks 30, 32 are reciprocated in the directions 26, 28, the gears 34, 36 are reciprocated rotationally about rotational axis 38 in a clockwise and counterclockwise direction. When the left pedal 16 is pushed forward in the direction 26, the gear 34 rotates in the counterclockwise direction from the view shown in FIG. 3. Through a series of gears in the device 10, the right foot pedal 18 is traversed backward in the direction 28. The gear 36 rotates in the clockwise direction from the view shown in FIG. 3 in order to push the right rack 32 and the foot pedal 18 in the backward direction 28. Conversely, when the right pedal 18 is pushed forward in the direction 26, the gear 36 rotates in the counterclockwise direction from the view shown in FIG. 3. Through a series of gears in the device 10, the left foot pedal 16 is traversed backward in the direction 28. The gear 34 rotates in the clockwise direction as shown in FIG. 3 in order to push the left rack 30 and the foot pedal 16 in the backward direction 28.

The gear 34 and the gear 38 may be fixed to each other so that rotation of the gear 38 rotates gear 34, and vice versa. To this end, the gear 34 and the gear 38 may be pinned or rotationally fixed to shaft 42. The shaft 42 may rotate within bearing 46 which may be mounted in housing 50. Similarly, the gear 36 and gear 40 may be fixed to each other so that rotation of the gear 36 rotates gear 40, and vice versa. To this end, the gear 36 and gear 40 may be pinned or rotationally fixed to shaft 44. The shaft 44 may rotate within bearing 48 which may be mounted in housing 50. The shafts 42, 44 may each define a rotational axis and the rotational axes of the shafts 42, 44 may be coaxially aligned to each other.

The gear 52 and bevel gear 54 may be mounted to shaft 56. Also, the gear 52 and the bevel gear 54 may be rotationally fixed to each other so that rotation of either gears 52, 54 rotates the other gears 54, 52. Additionally, the gear 58 and bevel gear 60 may be mounted to shaft 62. Also, the gear 58 and the bevel gear 60 may be rotationally fixed to each other so that rotation of either gears 58, 60 rotates the other gears 60, 58. The shafts 56 and 62 may be mounted to the housing 50 by way of bearings 64, 66.

The output shaft 12 may be disposed between the bevel gears 54, 60. Also, each of the bevel gears 54, 60 may engage first and second bevel gears 68, 70 which are mounted to the output shaft 12 by way of first and second one-way bearings 20, 22. By way of example and not limitation, the one-way bearings 20, 22 may be mounted to the output shaft 12 so that the one-way bearings 20, 22 freely rotate when the one-way bearings 20, 22 are rotated in the counterclockwise direction but are engaged when the one-way bearings 20, 22 are rotated in the clockwise direction from the view shown in FIG. 2. In this manner, as each of the left and right foot pedals 16, 18 are pushed in the direction of arrow 26, reciprocally at different times, the output shaft 12 is rotated only in the clockwise direction (see FIG. 2) regardless of which one of the pedals 16, 18 is being pushed forward 26. Conversely, the one-way bearings 20, 22 may be mounted to the output shaft 12 so that the one-way bearings 20, 22 freely rotate when the one-way bearings 20, 22 are rotated in the clockwise direction but are engaged when the one-way bearings 20, 22 are rotated in the clockwise direction from the view shown in FIG. 2. In this manner, as each of the left and right foot pedals 16, 18 are pushed in the direction of arrow 26, reciprocally at different times, the output shaft is rotated only in the counterclockwise direction (see FIG. 2) regardless of which one of the pedals 16, 18 is being pushed forward. For purposes of discussion, the one-way bearings 20, 22 are discussed as if they were mounted to the output shaft 12 so that the one-way bearings 20, 22 are engaged when the one-way bearings 20, 22 are rotated in the clockwise direction, but may be mounted so engagement occurs during counterclockwise rotation.

When the user wants to propel the small human-powered watercraft or the small human powered vehicle forward, the user begins to pump the left and right foot pedals 16, 18 reciprocally in directions 26, 28. The user may push the foot pedal 16 in the direction 26 which rotates gear 34 in the counterclockwise direction. Gears 38, 34 are mounted to a common shaft 42 so that counterclockwise rotation of the gear 34 causes gear 38 to rotate counterclockwise as well. Gear 38 rotates gear 52 in the clockwise direction. Gear 52 and gear 54 are rotationally fixed to shaft 56 so that clockwise rotation of gear 52 rotates bevel gear 54 in the clockwise direction as well. First and second bevel gears 68, 70 are engaged to bevel gear 54. Rotation of the bevel gear 54 in the clockwise direction rotates the first bevel gear 68 in the clockwise direction 72 as shown in FIG. 2. The second bevel gear 70 is rotated in the counterclockwise direction 74. The first bevel gear 68 is mounted to the first one-way bearing 20. Since the first bevel gear 68 is being rotated in the clockwise direction, so is the first one-way bearing 20. The first one-way bearing is actively engaged to the output shaft 12. The first bevel gear 68 through the first one-way bearing 20 rotates the output shaft 12 in the clockwise direction. The first bevel gear 68 is forcing rotation of the output shaft 12. The second bevel gear 70 is rotated in the counterclockwise direction and so is the second one-way bearing 22. The second bevel gear 70 is freely spinning because of the second one-way bearing.

The first and second gears 68, 70 are also engaged to bevel gear 60. Clockwise rotation of the first bevel gear 68 and counterclockwise rotation of the second bevel gear 70 rotates the bevel gear 60 in the counterclockwise direction from the view shown in FIG. 3. Bevel gear 60 and gear 58 are rotationally fixed to each other on shaft 62 so that gear 58 also rotates in the counterclockwise direction. Counterclockwise rotation of the gear 58 rotates the gear 40 in a clockwise direction. The gear 36 is pinned to shaft 44 as is gear 40 so that the rack 32 is traversed in the backward direction 28. The foot pedal 18 is pushed backward. When the left foot pedal 16 is pushed fully forward, the right foot pedal 18 is pushed fully backwards.

The user may now reciprocate the left and right foot pedals 16, 18. The user may push the right foot pedal 18 in the direction 26 which rotates gear 36 in the counterclockwise direction. Gear 40 is mounted to the common shaft 44 as is gear 36 so that counterclockwise rotation of the gear 36 causes gear 42 to rotate in the counterclockwise direction as well. Gear 40 rotates gear 58 in the clockwise direction. Gear 60 and gear 58 are rotationally fixed to shaft 62 so that clockwise rotation of gear 58 rotates gear 60 in the clockwise direction as well. First and second bevel gears 68, 70 are engaged to bevel gear 60. Rotation of the bevel gear 54 in the clockwise direction rotates the first bevel gear 68 in the counterclockwise direction 74 from the view shown in FIG. 2. The second bevel gear 70 is rotated in the clockwise direction 72. The first bevel gear 68 as discussed above is mounted to the first one-way bearing 20. Since the first bevel gear 68 is being rotated in the counterclockwise direction, so is the first one-way bearing. The first bevel gear through the first one-way bearing 20 rotates freely about the output shaft 12 in the counterclockwise direction. The second bevel gear 70 is rotated in the clockwise direction and so is the second one-way bearing 22. In this regard, the second bevel gear through the second one-way bearing 22 forcibly rotates the output shaft 12 in the clockwise direction. In this regard, whenever the user pushes either of the first or second foot pedals 16, 18 in the direction 26, the output shaft 12 is rotated in the clockwise direction.

Because the first and second gears 68, 70 are also engaged to the bevel gear 54, counterclockwise rotation of the first bevel gear 68 and clockwise rotation of the second bevel gear 70 rotates bevel gear 54 in the counterclockwise direction from the view shown in FIG. 3. Bevel gear 54 and gear 52 are rotationally fixed to each other on shaft 56 so that gear 52 also rotates in the counterclockwise direction. Counterclockwise rotation of the gear 52 rotates the gear 38 in a clockwise direction. The gear 34 is pinned to shaft 42 as is gear 38 so that the rack 32 is moved in the direction of arrow 28. The foot pedal 16 is pushed backward. When the right foot pedal 18 is pushed fully forward, the left foot pedal 16 is pushed fully backwards.

As a user pushes the foot pedals 16, 18 forward in a reciprocal fashion, the output shaft 12 receives rotational power under both forward strokes of the left and right foot pedals 16, 18 to rotate in the clockwise direction to drive either a propeller for a small human powered watercraft or a small human powered land vehicle.

Figure 4:
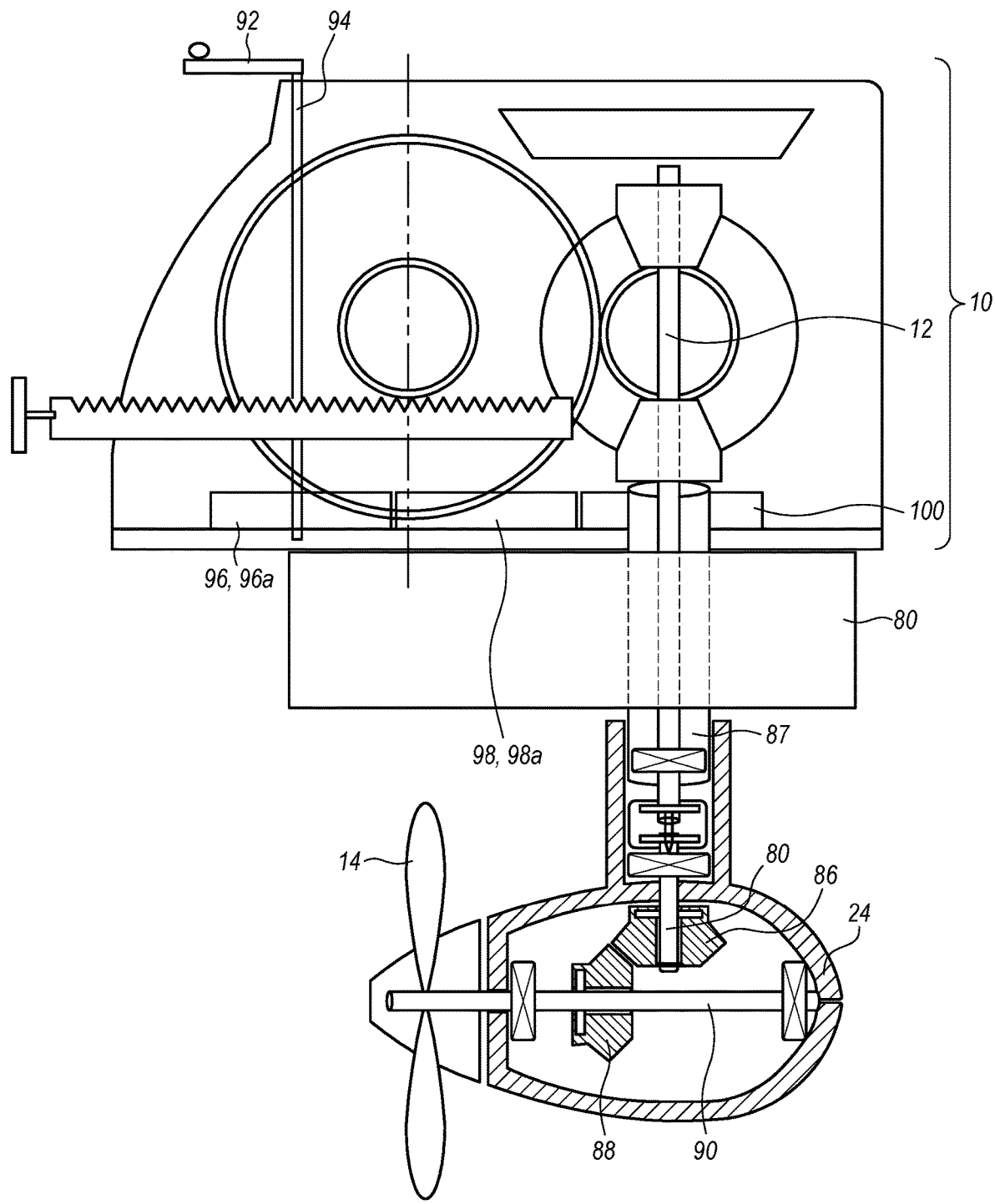
FIG. 4 is a cross-sectional right side view of the device shown in FIG. 1.

Referring now to FIG. 4, the device 10 may be mounted to a hull 80 of the small human powered watercraft. The output shaft 12 may be connected to an input shaft 82 of the transmission box 24. The output shaft 12 and the input shaft 82 may be connected to each other with a flexible coupling 84 so that any misalignment between the input shaft 82 and the output shaft 12 is not detrimental to the transmission of rotational power from the output shaft 12 to the input shaft 82. Rotation of the input shaft 82 also rotates bevel gear 86 and bevel gear 88. Output shaft 90 is rotated by rotation of the beveled gear 88. The propeller 14 may be mounted to the output shaft 90.

The transmission box 24 may be mounted to a rotatable cylinder 87 that may project through the hull 80 of the small human powered watercraft. The transmission box 24 may be secured to the rotatable cylinder 87 so that rotation of the rotatable cylinder 87 also rotates the transmission box 24 as well as the propeller. The rotatable cylinder 87 may be rotated about a vertical axis which may be coaxial aligned to a rotational axis of the output shaft 12. The user may rotate the direction of the propeller 14 with the handle 92. Handle 92 rotates bar 94. Bar 94 rotates gear 96 which in turn rotates gear 98 and gear 100. The rotatable cylinder 87 may be physically secured to gear 100 so that the rotatable cylinder 87 rotates in the same direction as gear 100. If the user wants to propel the small human powered watercraft in the opposite direction, the user may rotate the handle 92 until the propeller is located on the opposite side. The user may rotate the handle 92 to guide the small human powered watercraft left and right by redirecting the propeller in the appropriate direction.

The output shaft 12 may be oriented in a generally vertical direction. Moreover, the rotatable cylinder 87, as discussed above may be coaxially aligned with the output shaft 12. The output shaft 12 and the rotatable cylinder 87 may also be oriented in a generally vertical direction with respect to the surface of the water. In this regard, as the rotatable cylinder 87 is rotated, the propeller 14 can also provide propulsion in the direction of the propeller 14 360° about the output shaft 12. In this regard, the propeller can be rotated 180° so that the small human powered watercraft can be propelled backwards. Moreover, it is contemplated that there may be stops placed in the system so that the propeller 14 and the transmission box 24 can rotate through a limited range of angles such as 90°, 70°, 60°, 50°, 45° from center. The center being a position of the propeller 14 so that the small human powered watercraft is propelled straightforward.

The device 10, transmission box 24 and the system for rotating the transmission box 24 to direct the propeller in a certain direction to propel the small watercraft in a particular direction has been described in terms of utilizing gears. However, it is also contemplated that the transmission of power may be accomplished with belts and pulleys both fixed and continuously variable (e.g. continuously variable transmissions). By way of example and not limitation, the transmission of rotational movement between the gears 96, 98 may also be accomplished by replacing the gears 96, 98 with pulleys 96*a*, 98*a* and attaching a belt between the pulleys 96*a*, 98*a*. Gears 40, 48 and gears 38, 52 may be replaced with pulleys and a belt attached between the pulleys 40*a*, 58*a*, 38*a*, 52*a* in order to transmit rotational movement. All of the gears or just some of the gears may be replaced with pulleys and a belt mounted to the pulleys in order to transmit rotational movement.

Referring now to FIG. 3, the rack 30, 32 is shown as being a linear, straight rack 30, 32. The rack 30, 32 engages the gears 34, 36. However, it is also contemplated that the rack 30, 32 may be curved and engage the gears 34, 36. Even though the rack 30, 32 may be curved, the pedals 16, 18 are not traversed through a circular motion 360° but only a portion of the 360°. In this manner, the rotational movement of the pedals 16, 18 may have a radius which is greater than that which could be accommodated if the pedals 16, 18 were traversed through a circular motion 360°. By allowing for a curved reciprocating motion of the pedals 16, 18, a more ergonomic motion may be designed in order to accommodate the biomechanical aspects of the user. For example, when the user pumps his or her feet forward, the knees rotate about the hips and there is both a forward as well as a vertical motion at the user's knees. The curved racks 30*a*, 32*a* may have a radius in order to account for the natural vertical motion due to the biomechanics of the human body.

Referring now to FIGS. 5-21, second and third embodiments of the device are shown which are belt driven compared to gear driven as shown in FIGS. 1-4. However, it is also contemplated the device may be driven through a combination of gear(s) and belt(s).

Figure 5:
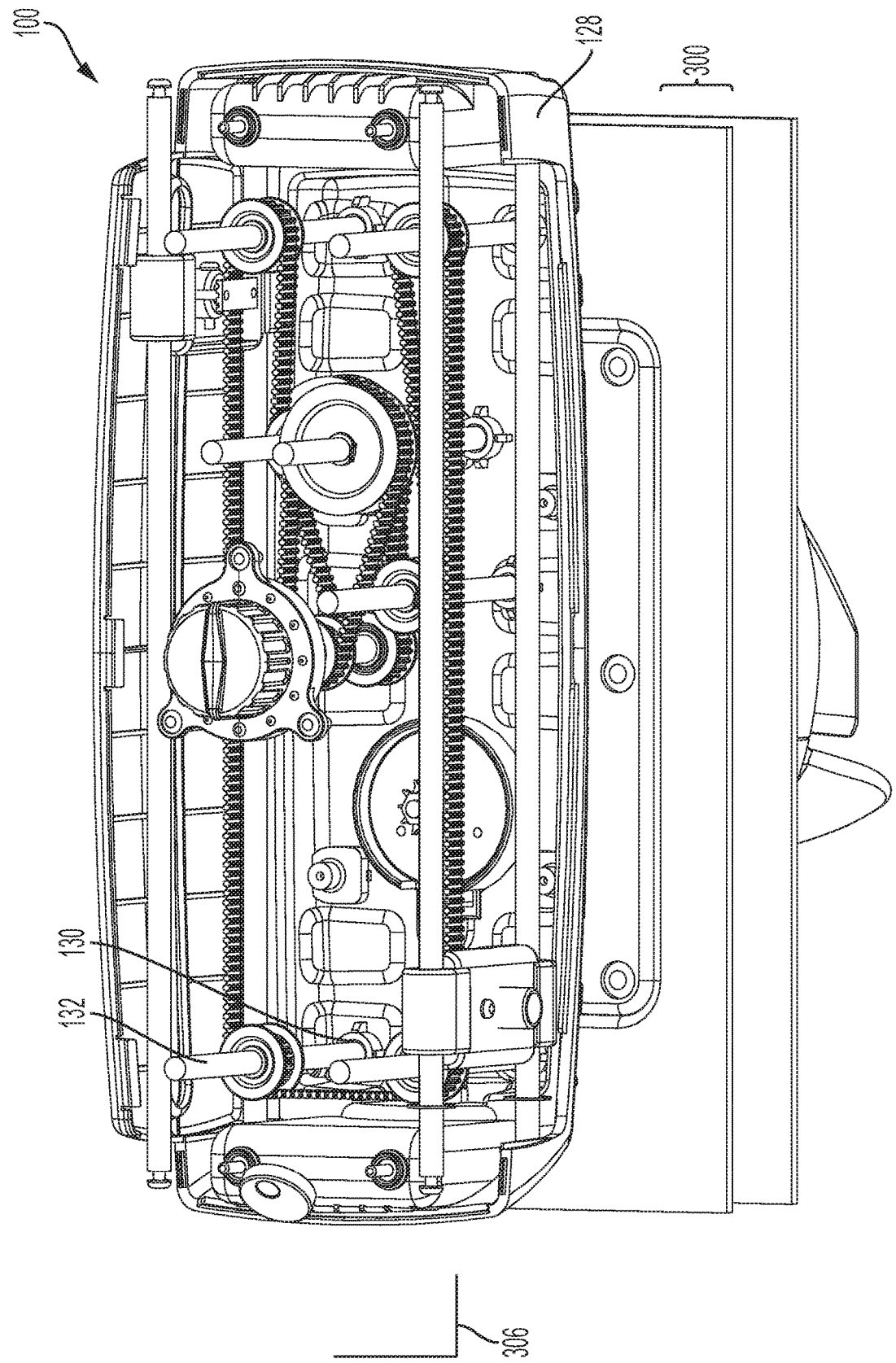
FIG. 5 is a perspective view of a second embodiment of the device.
Figure 6:
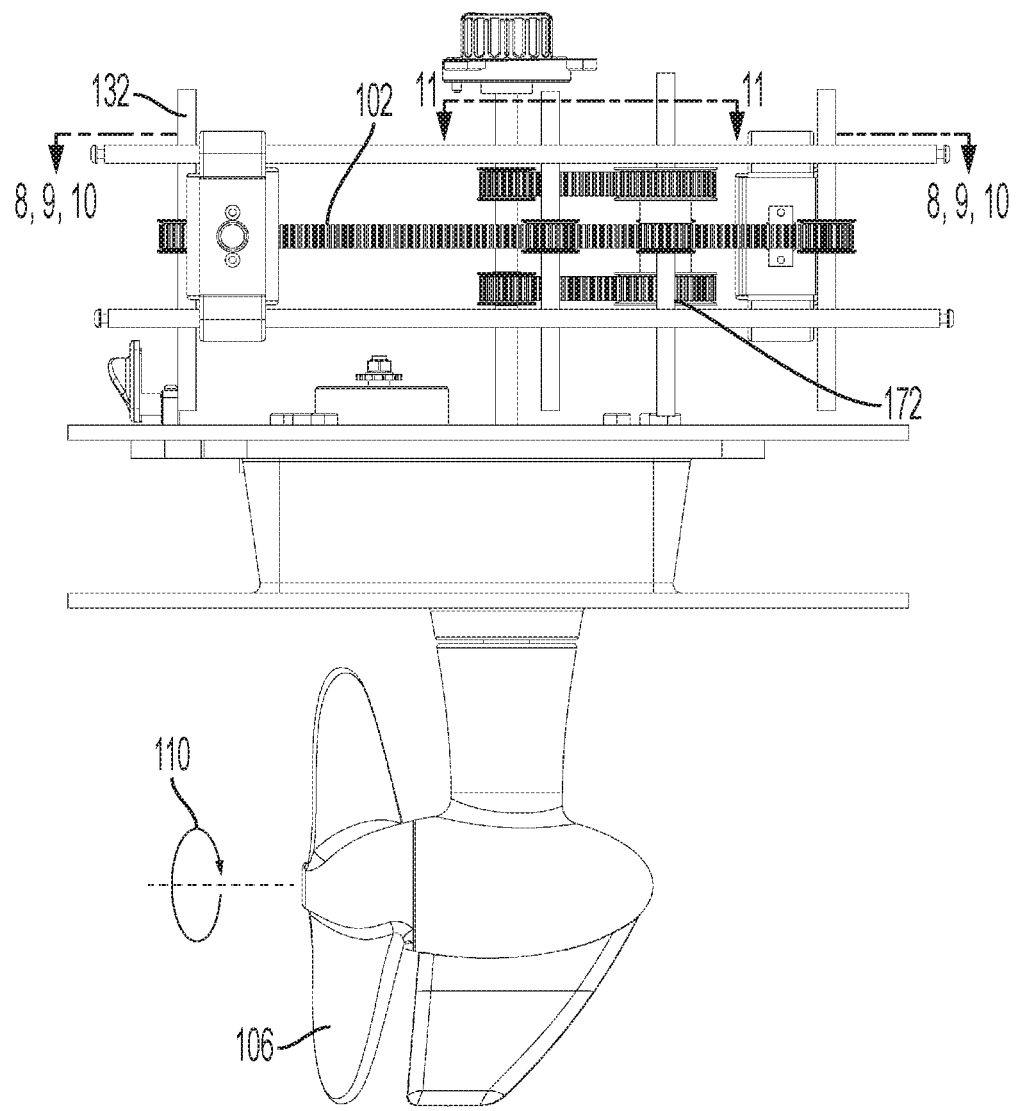
FIG. 6 is a cross-sectional right-side view of the device shown in FIG. 5.
Figure 7:
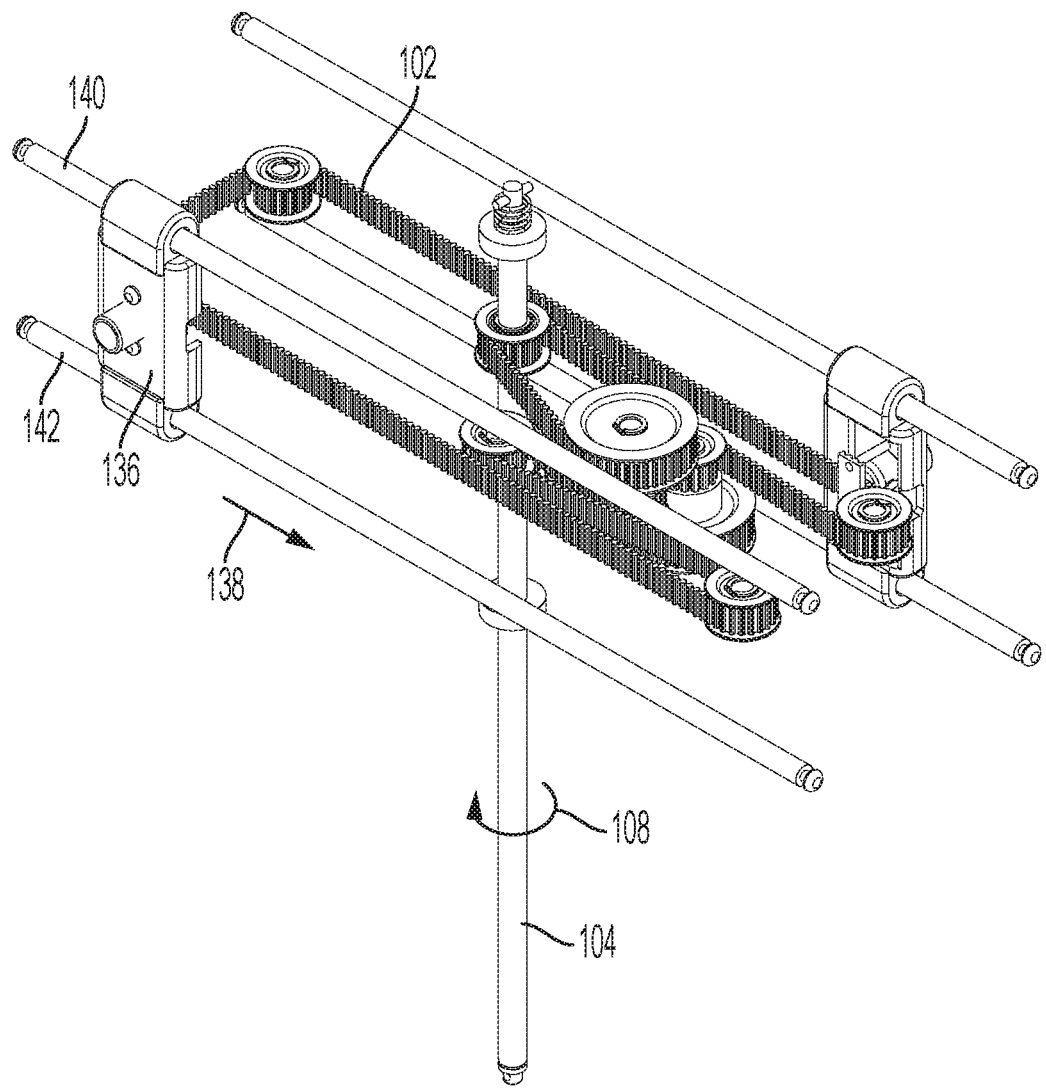
FIG. 7 is a perspective view of the device shown in FIG. 6 with a housing and propeller removed therefrom.

Referring now to FIGS. 5-12, the second embodiment of the device 10 is shown. The device 100 is described in relation to FIGS. 5-12. Instead of beveled gears shown in the embodiment shown in FIGS. 1-4, the device 100 may utilize one or more double-sided timing belt. The system of belts may include a main drive belt 102 (see FIG. 8) which rotates a propeller shaft 104 (see FIGS. 7 and 8) in the direction 108 which, in turn, rotates a propeller 106 (see FIG. 6) in the direction 110 as shown in FIGS. 6 and 7. The main drive belt 102 may be wrapped around a series of pulleys 112, 114, 116, 123, 118, 120, 122. The drive belt 102 rotates pulleys 120, 118 in opposite direction which, in turn, drives driven belts 124, 126 which, in turn, alternately rotates the propeller shaft 104 in the clockwise direction 108 each time one of the left and right foot pedals is pushed forward.

More particularly, the device 100 may have a housing 128, as shown in FIG. 5. The housing 128 may have upper and lower halves. Only the lower half is shown in FIG. 5 and the upper half is removed for the purposes of being able to view the belt system of the device 100. The upper and lower halves of the housing 128 may have locating holes 130 (FIG. 5) which receive shafts 132 to position the pulleys 112-122, 123 in their respective locations within the housing 128. The pulleys 112-122, 123 may rotate about the shafts 132. The pulleys 112-122, 123 may be fixed vertically on shaft 132 (see FIGS. 6 and 7) but as discussed above may rotate about the shaft 132. FIG. 6 illustrates vertical positions of the pulleys 112-122, 123 within the housing 128.

Figure 8:
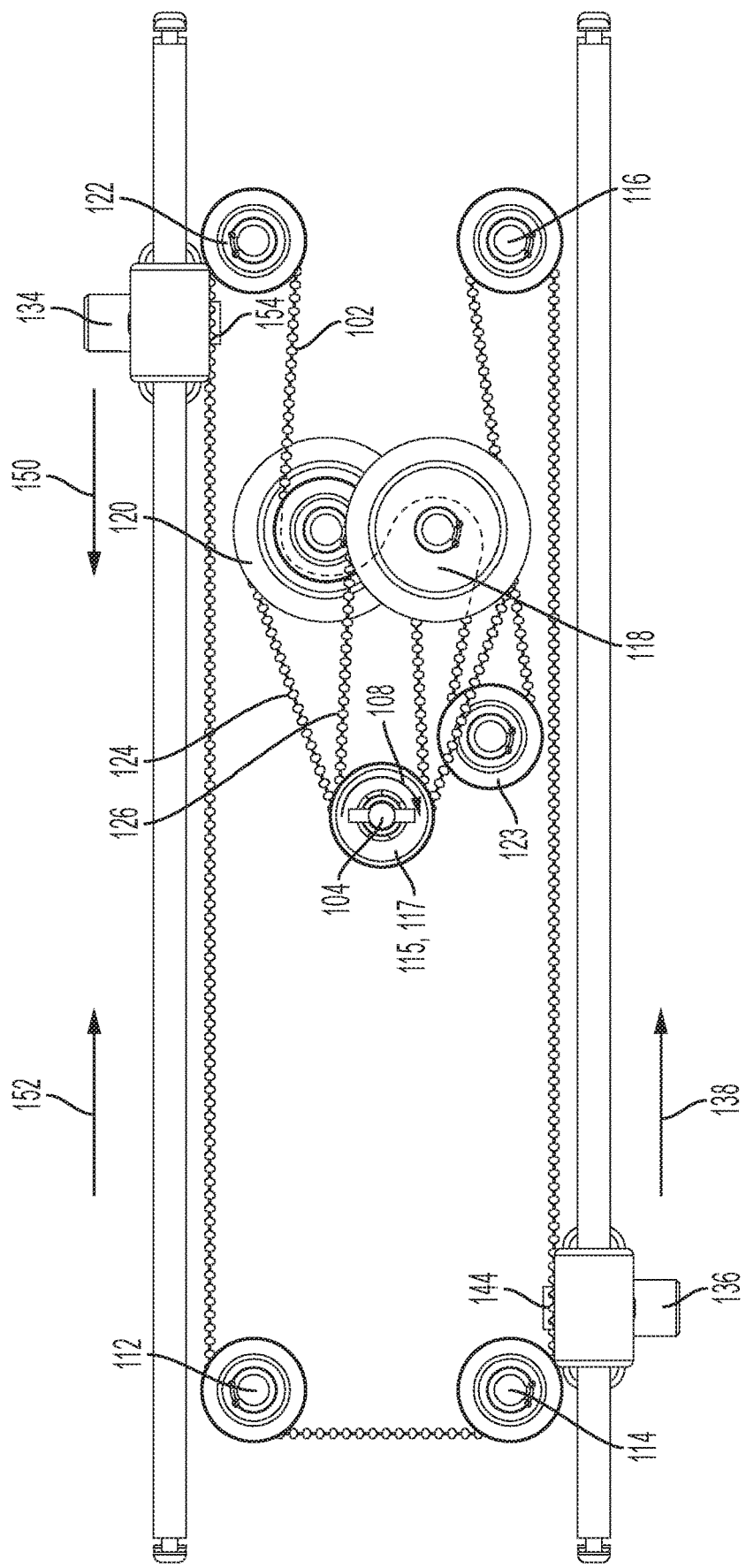
FIG. 8 is a top view of the device shown in FIG. 6.

Referring now to FIG. 8, the left and right pedals 16, 18 may be attached to left and right brackets 134, 136. With the user's left and right feet on the left and right pedals 16, 18 and ready to push the left and right pedals 16,18 in the direction of arrows 138, 152, the user is ready to propel the vehicle (e.g., watercraft, water vehicle, kayak and land vehicle) forward. When the user pushes the right pedal 18, the right bracket 136 is traversed along guide rails 140, 142 (FIG. 7). Moreover, the main drive belt 102 is secured to the right bracket 136 at location 144 (See FIG. 8). As the right bracket 136 is traversed along the direction of arrow 138, the belt 102 is rotated in the counterclockwise direction. Simultaneously, pulleys 112, 114, 116, 118, 122 are rotated about their respective shafts 132 in the counterclockwise direction while pulleys 123, 120 are rotated in the clockwise direction.

Figure 9:
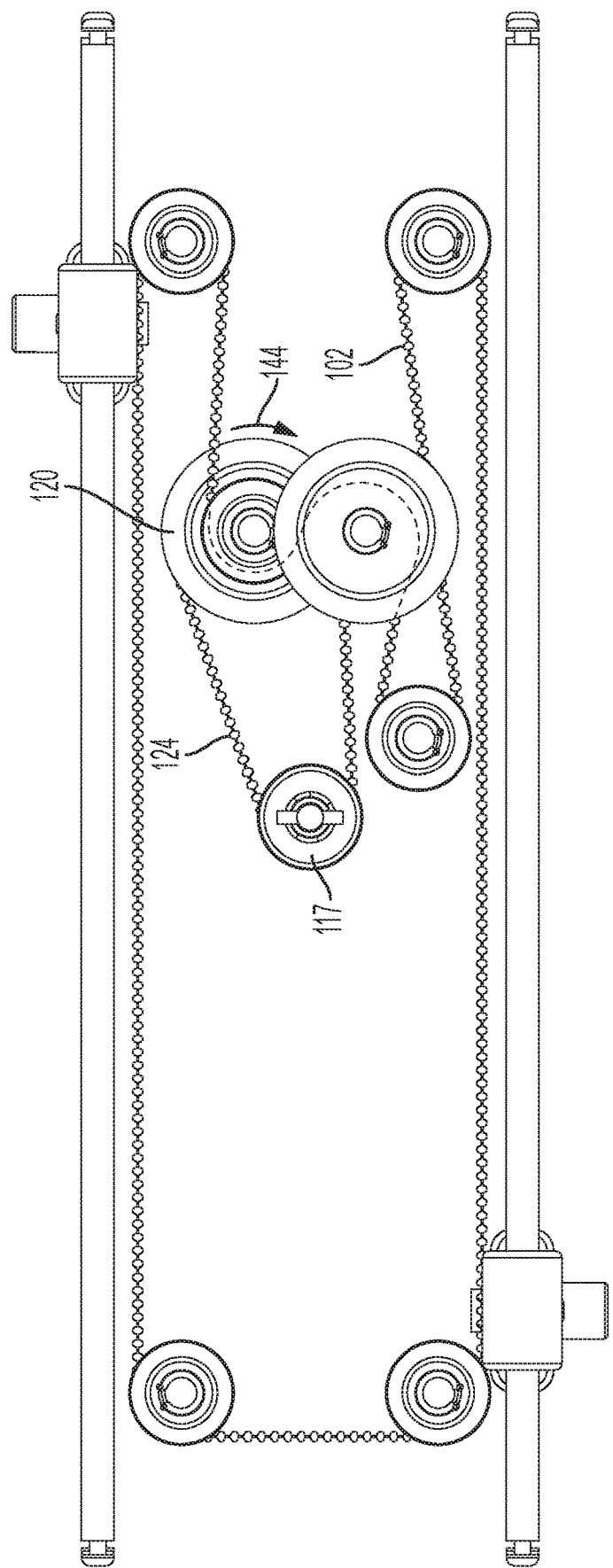
FIG. 9 is a top view of the device shown in FIG. 6 showing only a first of two belts for driving a propeller shaft which is hidden from view.
Figure 11:
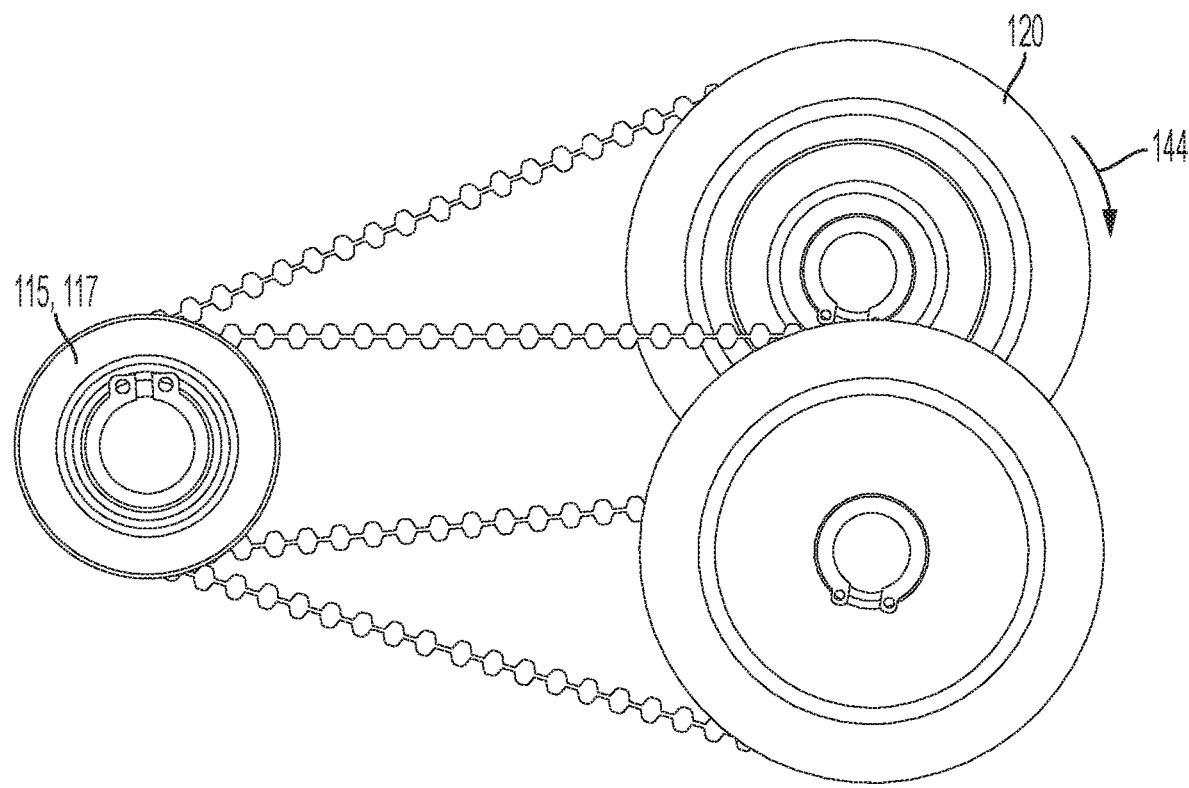
FIG. 11 is an enlarged top view of the two belts driving the propeller shaft.
Figure 12:
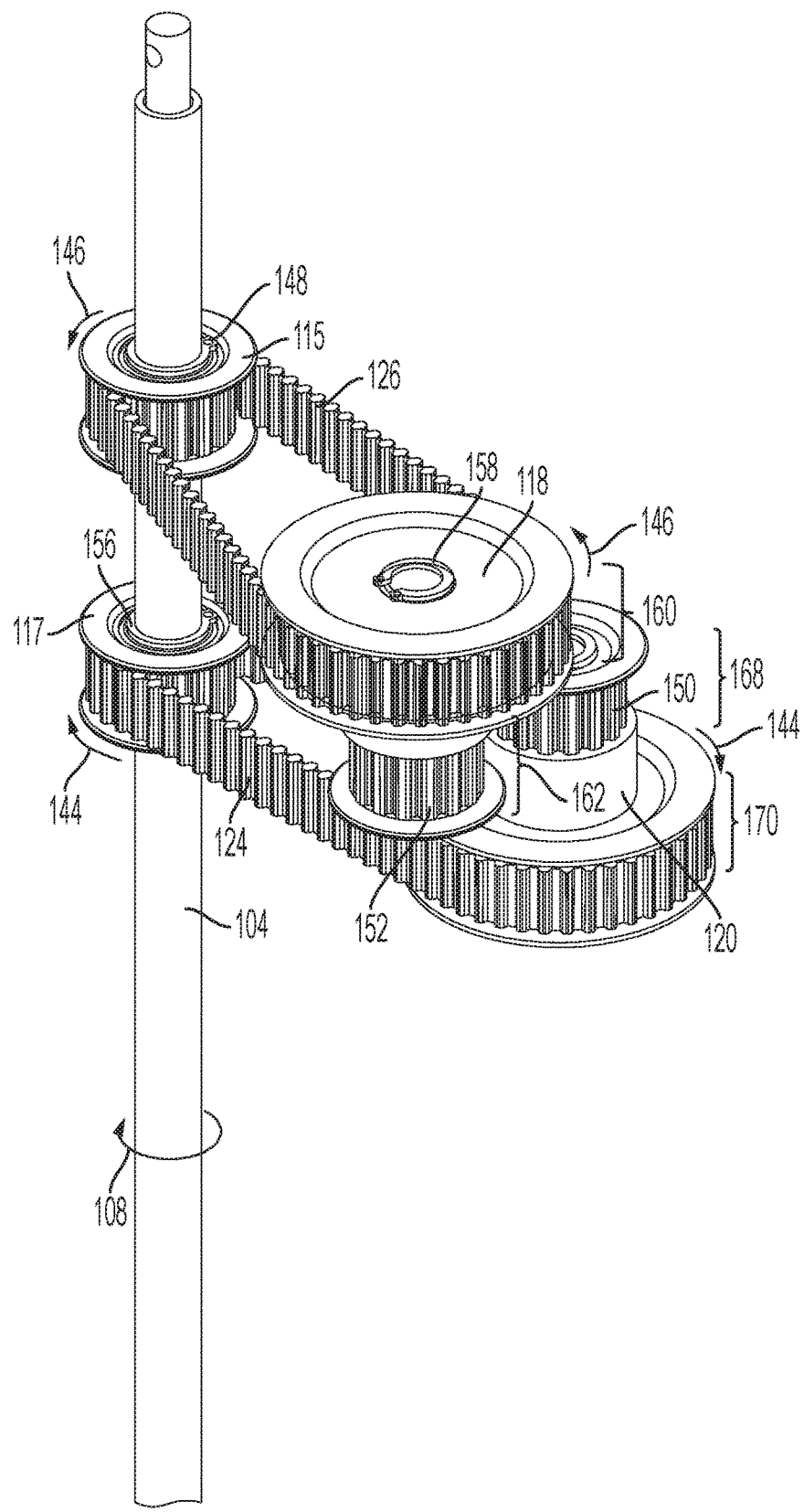
FIG. 12 is an enlarged perspective view of the two belts for driving the propeller shaft.

In the arrangement of pulleys 112-122, 123, pulleys 118, 120 are always rotated opposite directions. When the pulley 120 is rotated in the clockwise direction, the pulley 118 will rotate into counterclockwise direction. Conversely, when the pulley 118 rotates into clockwise direction, the pulley 120 will rotate in the counterclockwise direction. Only when the pulley 120, 118 is rotated in the clockwise direction will the driven belt 124, 126 attached to that clockwise rotating pulley 120, 118 rotate the pulley 115, 117 and the propeller shaft 104 in the clockwise direction. Referring now to FIGS. 9, 11 and 12, when the pulley 120 rotates in the clockwise direction 144, the pulley 117 is driven or rotated in the clockwise direction 144 via transmission of rotational power through belt 124. The pulley 117 is mounted to propeller shaft 104 with a one-way bearing that is engaged only during clockwise rotation. Thus, propeller shaft 104 is rotated in the clockwise direction. However, as discussed above, the pulley 118 is rotated in the counterclockwise direction 146 (see FIG. 12) when the pulley 120 is rotated clockwise direction 144 (see FIG. 12). This is permitted because the pulley 115 is fitted with a one-way bearing and mounted to the propeller shaft 104. This means that when the pulley 115 is rotated in the counterclockwise direction 146, the one-way bearing 148 is freewheeling or disengages the pulley 115 from the propeller shaft 104. Conversely, when the pulley 115 is rotated in the clockwise direction 144, the one-way bearing 148 is engaged so that clockwise rotation of the pulley 115 rotates the propeller shaft 104 in a clockwise direction.

When the right pedal 18 and right bracket 136 are pushed all the way down the guide rails 140, 142, the left pedal and left bracket 134, 16 are traversed in the opposite direction 150.

With the left pedal 16 in the retracted position, the user may now push the left pedal in the direction of the arrow 152 (see FIG. 8). In doing so, the belt 102 which is attached to the left bracket 134 at location 154 traverses the belt 102 in the clockwise direction. This, in turn, rotates pulleys 112, 114, 116, 118, 122 in the clockwise direction while pulley 120, 123 is rotated in the counterclockwise direction.

Figure 10:
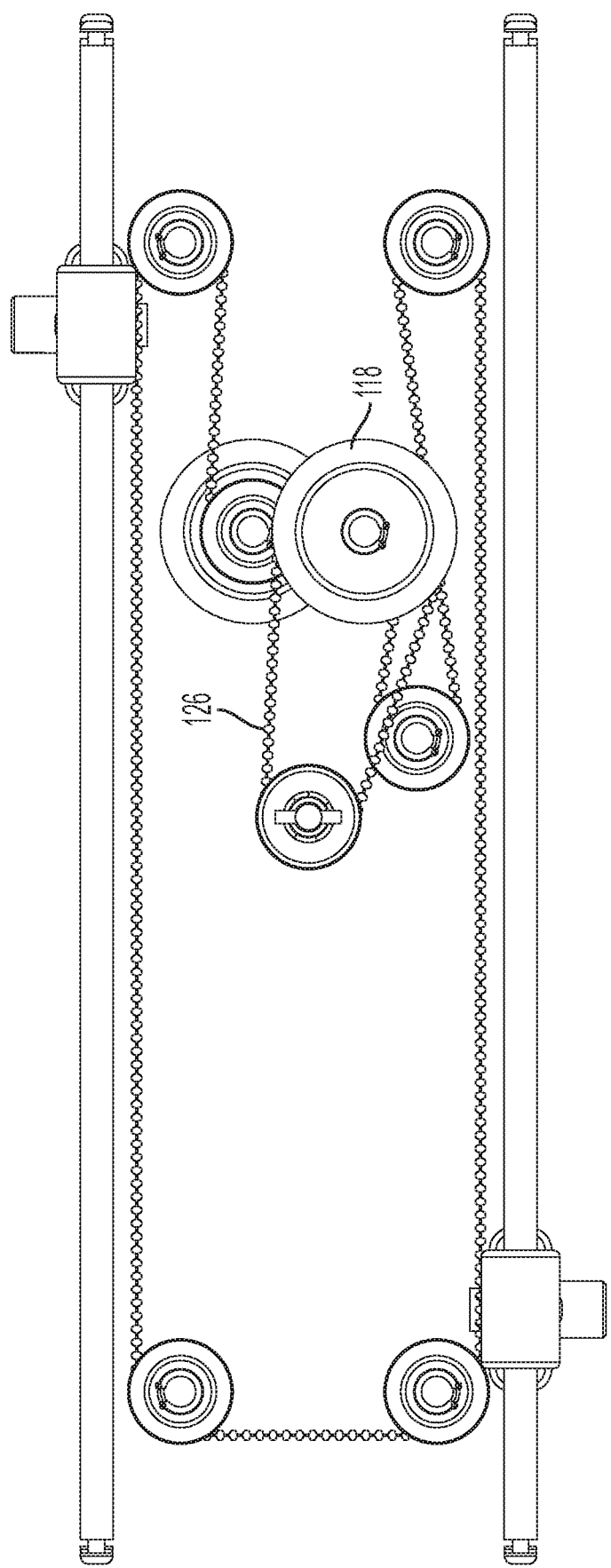
FIG. 10 is a top view of the device shown in FIG. 6 showing only a second of two belts driving the propeller shaft which is hidden from view.

Referring now to FIGS. 10, 11, and 12, when pulley 118 is rotated in the clockwise direction, the driven belt 126 is rotated in the clockwise direction as well. This, in turn, also rotates the pulley 115. The pulley 115 may be mounted to the propeller shaft 104 with a one-way bearing which is engaged only when the pulley 115 is rotated in the clockwise direction. Hence, the propeller shaft is rotated in the clockwise direction. As discussed above, the pulleys 118, 120 are rotated in opposite directions. When the pulley 118 is rotated in the clockwise direction, pulley 120 is rotated in the counterclockwise direction. In the counterclockwise direction, the bearing 156 (see FIG. 12) which mounts the pulley 117 to the propeller shaft 104 is not engaged so that the pulley 117 can rotate in the counterclockwise direction.

The following discussion is in relation to a variant of the second embodiment shown in FIGS. 5-12. In lieu of one-way bearings 148, 156 (See FIG. 12) being used to mount the pulleys 115, 117 to the propeller shaft 104, an alternate variant to the second embodiment may include a situation where the one way bearings are located or used to mount the pulleys 118, 120. In this regard, pulleys 115, 117 may be fixed to the propeller shaft 104 so that the pulleys 115, 117 only rotate in the clockwise direction which in turn rotate the propeller shaft 104 in the clockwise direction 108. Because the pulleys 115, 117 are now pinned to the propeller shaft 104, one-way bearings may be incorporated into the pulleys 118, 120 and more particularly, upper pulley 168 and lower pulley 162, as shown in FIG. 12. In this regard, as the right pedal 18 is pushed in the direction of arrow 138, the main drive belt 102 rotates in the counterclockwise direction. When the main drive belt 102 rotates in the counterclockwise direction, the pulley 118 rotates in a counterclockwise direction while the pulley 120 rotates in the clockwise direction. A one-way bearing 158 (See FIG. 12) may mount a lower pulley 162 of the pulley 118 to its shaft 132. This allows for disengagement between an upper pulley 160 of the pulley 118 from a lower pulley 162 of the pulley 118 to allow the main drive belt 102 to continue to rotate the lower pulley 162 of the pulley 118 in the counterclockwise direction. However, because the propeller shaft 104 can only be rotated in the clockwise direction to move the vehicle forward, the one-way bearing 158 disengages the upper pulley 160 of the pulley 118 from its shaft 132 the lower pulley 162 of the pulley 118. In other words, the lower pulley 162 of the pulley 118 is separate from the upper pulley 160 of the pulley 118. The upper pulley 168 may be pinned to the shaft 132 on which it is mounted while the lower pulley 162 of the pulley 118 incorporates the one-way bearing so that when the lower pulley 162 is rotated in the clockwise direction does it rotate shaft 132 and the upper pulley 160. When the lower pulley is rotated in the counterclockwise direction, the lower pulley is disengaged from the shaft. The shaft 132 does not rotate and does not rotate the upper pulley 160 of the pulley 118, and thus does not turn the belt 126. Instead, the driven belt 124 rotates the propeller shaft 104 in the clockwise direction which translates such rotational movement to the pulley 115 and the belt 126 and the upper pulley 160 of the pulley 118 is rotated in the clockwise direction while the lower pulley is rotated in the counterclockwise direction.

Referring now to pulley 120, the same also has upper and lower pulleys 168, 170. These upper and lower pulleys 168, 170 may be separated from each other so that they can rotate in opposite directions when needed just like upper and lower pulleys 160, 162 of pulley 118. More particularly, the lower pulley 170 may be pinned to the shaft 132 upon which it is mounted. In contrast, the upper pulley 168 may be mounted to the shaft 132 to which it is mounted with a one-way bearing. As discussed above, when the right foot pedal 18 is traversed in the direction of arrow 138, pulley 120 is rotated in the clockwise direction. This means that the upper pulley 168 of the pulley 120 is rotated in the clockwise direction. The one way bearing of the upper pulley 168 of the pulley 120 is engaged and rotates shaft 132 and also rotates the lower pulley 170 of the pulley 120.

Conversely, when the left foot pedal is in the retracted position and pushed in the direction of arrow 152 (see FIG. 8), the main drive belt 102 rotates in the counterclockwise direction. However, the pulley 120 rotates in the counterclockwise direction while the pulley 118 rotates in the clockwise direction. In this regard, referring now to FIG. 12, the main drive belt 102 rotates the upper pulley 168 of the pulley 120 in the counterclockwise direction. However, it does not rotate the lower half 170 of the pulley 120 in the counterclockwise direction because the one-way bearing, which is mounted to the lower pulley 170 of the pulley 120 is disengaged. In fact, the lower pulley 170 of the pulley 120 rotates in the clockwise direction through the rotational translation from the pulley 118, to the driven belt 26, to the pulley 115, to the propeller shaft 104, to the pulley 117 then to the driven belt 124. As discussed above, when the main drive belt 102 rotates in the clockwise direction, the pulley 118 rotates in the clockwise direction as well. In this regard, the pulley 152 rotates in the clockwise direction and is pinned to the shaft 132 which rotates in the clockwise direction. Because the one-way bearing 158, which mounts the upper half 160 of the pulley to the shaft 132, the upper pulley 168 of the pulley 118 is rotated in the clockwise direction. Such clockwise rotation of the upper pulley 168 of the pulley 118 rotates the driven belt 126 in the clockwise direction as well as pulley 115 and the propeller shaft 104.

The belt system shown in the embodiment illustrated in FIGS. 5-12 utilize a double-sided timing belt for the main drive belt 102. However, it is also contemplated that if the pulleys had sufficient friction with the belt so that there is minimal slippage between the belt and the respective pulleys, a timing belt would not be needed but other types of belts could be used including but not limited to flat belts, V groove belts, etc. Moreover, although a double-sided timing belt is shown for the driven belts 124, 126 it is also contemplated that such driven belts 124, 126 may utilize a single-sided timing belt or, in the alternative, a friction belt such as a flat belt or V groove belt. Additionally, it is contemplated that the pulleys 115, 117, 118, 120 may utilize a continuously variable transmission pulley instead of its fixed diameter pulleys as shown in the drawings. This allows the user to adjust the speed of the propeller for each stroke of the pedals 16, 18.

Figure 16:
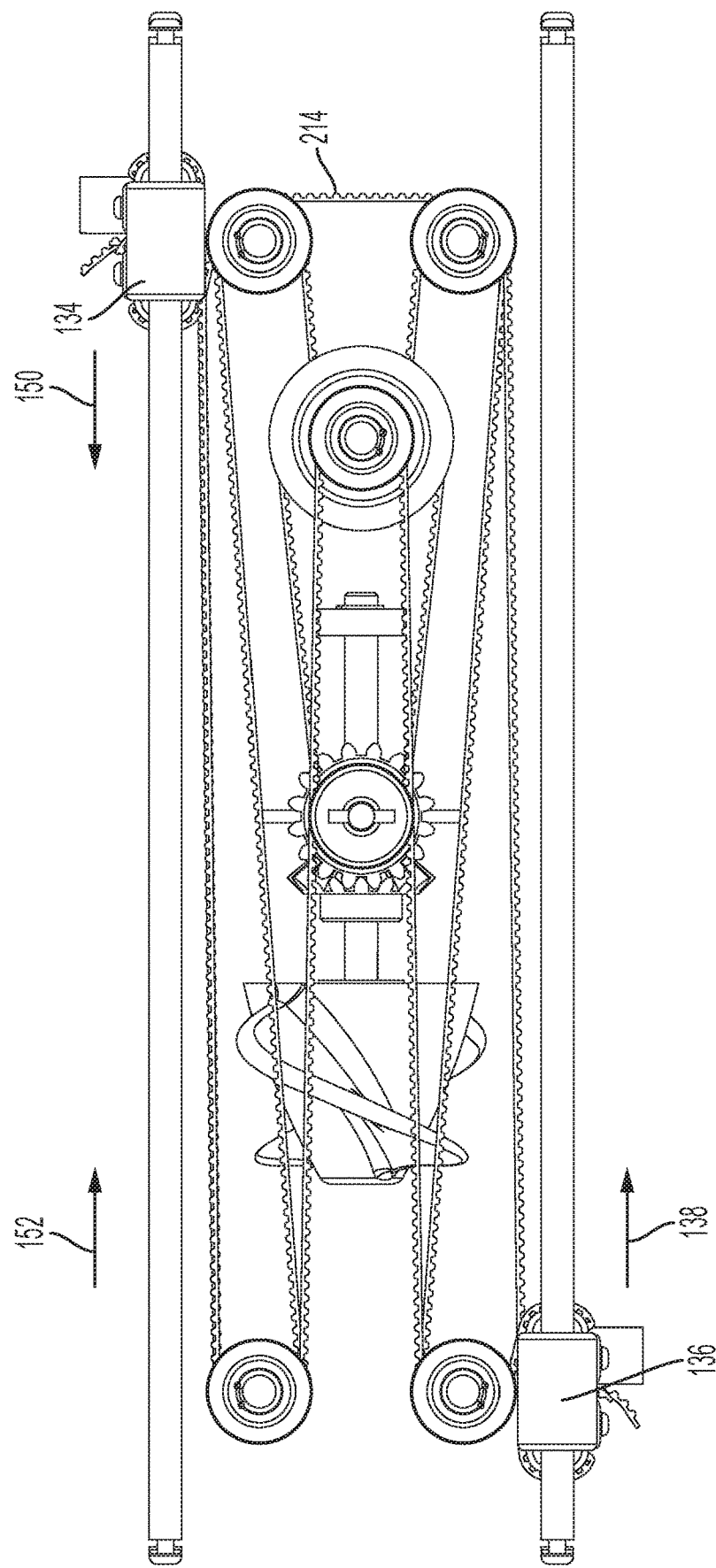
FIG. 16 is a top view of the device shown in FIG. 15.
Figure 17:
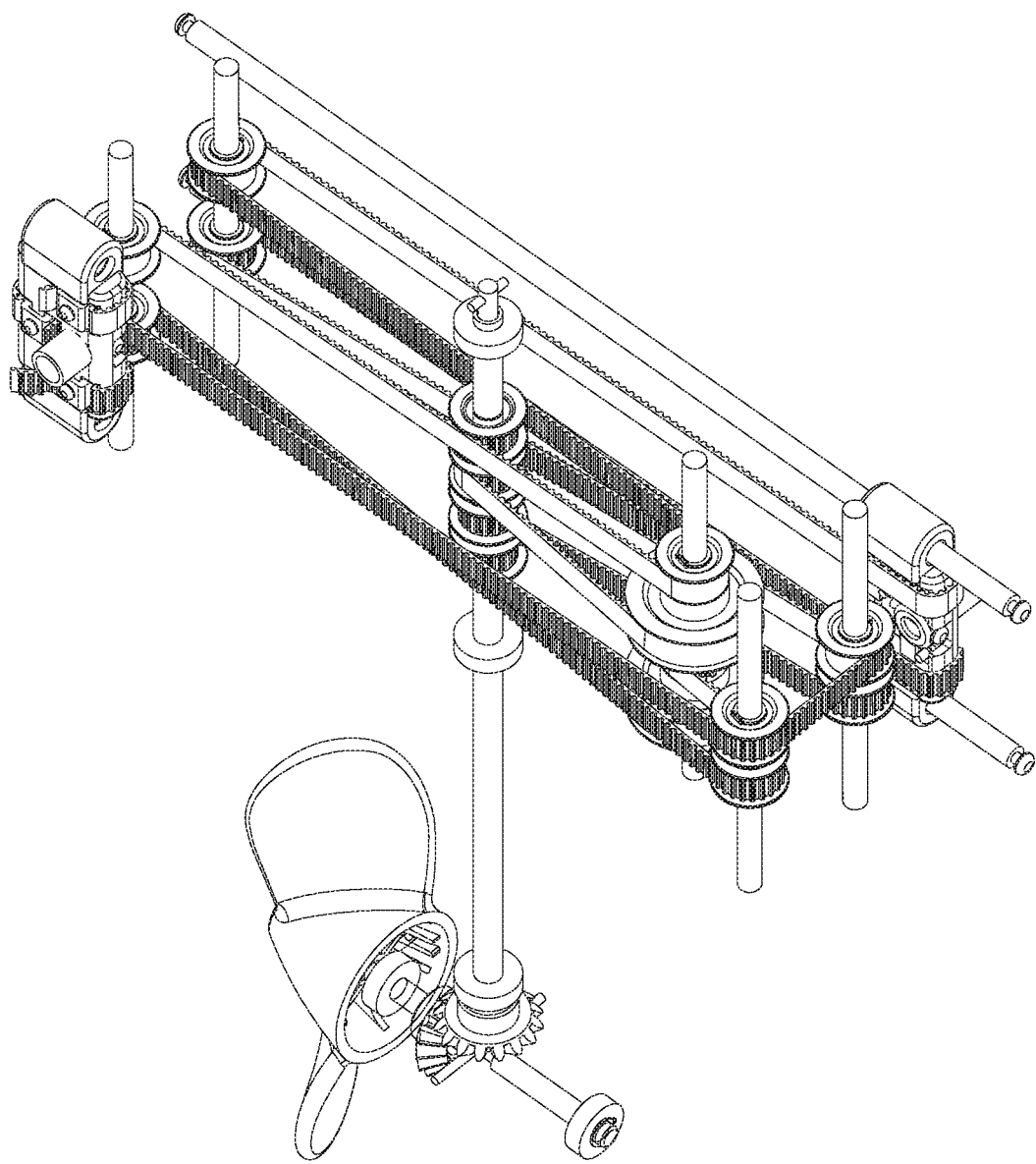
FIG. 17 is a perspective view of the device shown in FIG. 15.
Figure 18:
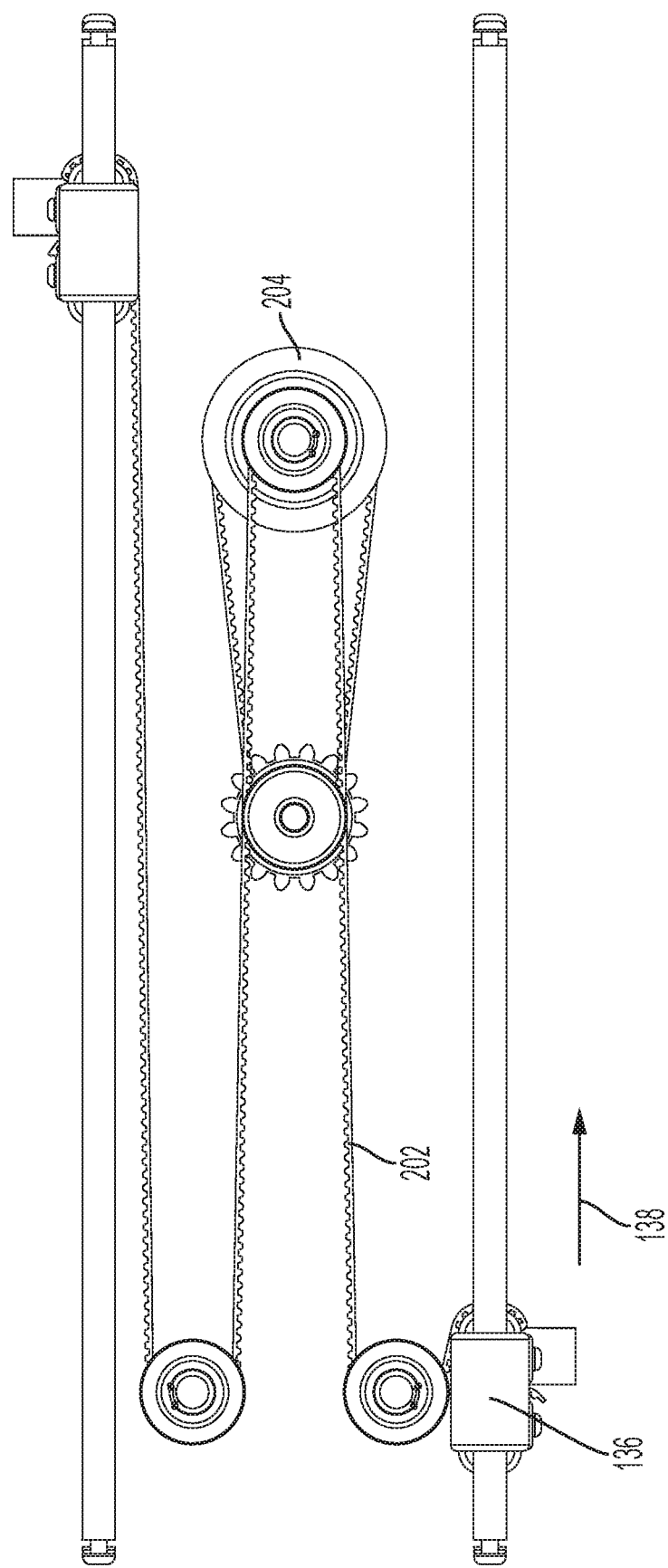
FIG. 18 is a top view of the device shown in FIG. 15 illustrating a first drive belt and a first driven belt which rotates a propeller shaft.

Referring now to FIGS. 13-21, the third embodiment of the device 200 is shown in which a single timing belt may be used. In FIG. 16, when the right pedal 18 and the right bracket 136 are in the position shown in FIG. 16, the user can traverse the right pedal 18 and the right bracket 136 in the direction of arrow 138. In this instance, a first drive belt 202 (FIG. 18) is rotated about pulley 204 (See FIGS. 18 and 21). The pulley 204 is also connected to pulley 206 with driven belt 208. The pulley 206 is attached to the propeller shaft 104 with a one-way bearing 210. When the pulley 206 is rotated in the clockwise direction, the one-way bearing 210 is engaged so that the rotation of the pulley 206 in the clockwise direction also rotates the propeller shaft 104 in the clockwise direction as well. Still referring to FIG. 21, the pulley 210 is also mounted to the propeller shaft 104 with a one-way bearing 212. However, when the pulley 210 is rotated in the counterclockwise direction, the one-way bearing 212 is disengaged. The pulley 210 rotates in the counterclockwise direction when the right bracket 136 is traversed in the direction of arrow 138 because the first drive belt 202 is also connected to the left bracket 134. The left bracket 134 is traversed to the retracted position in the direction of arrow 150 (see FIG. 16) as the right bracket 136 is traversed in the direction 138. The left bracket 134 drives the second drive belt 214 (See FIG. 20) which is wrapped around pulley 216 (See FIG. 21) rotates in the counterclockwise direction which rotates the pulley 210 in the counterclockwise direction. However, because of the one-way bearing 212 that mounts the pulley 210 to the propeller shaft 104 is disengaged, such counterclockwise direction is allowed. The pulleys 204, 216 are allowed to freely rotate about the shaft 132 in the counterclockwise direction.

Figure 20:
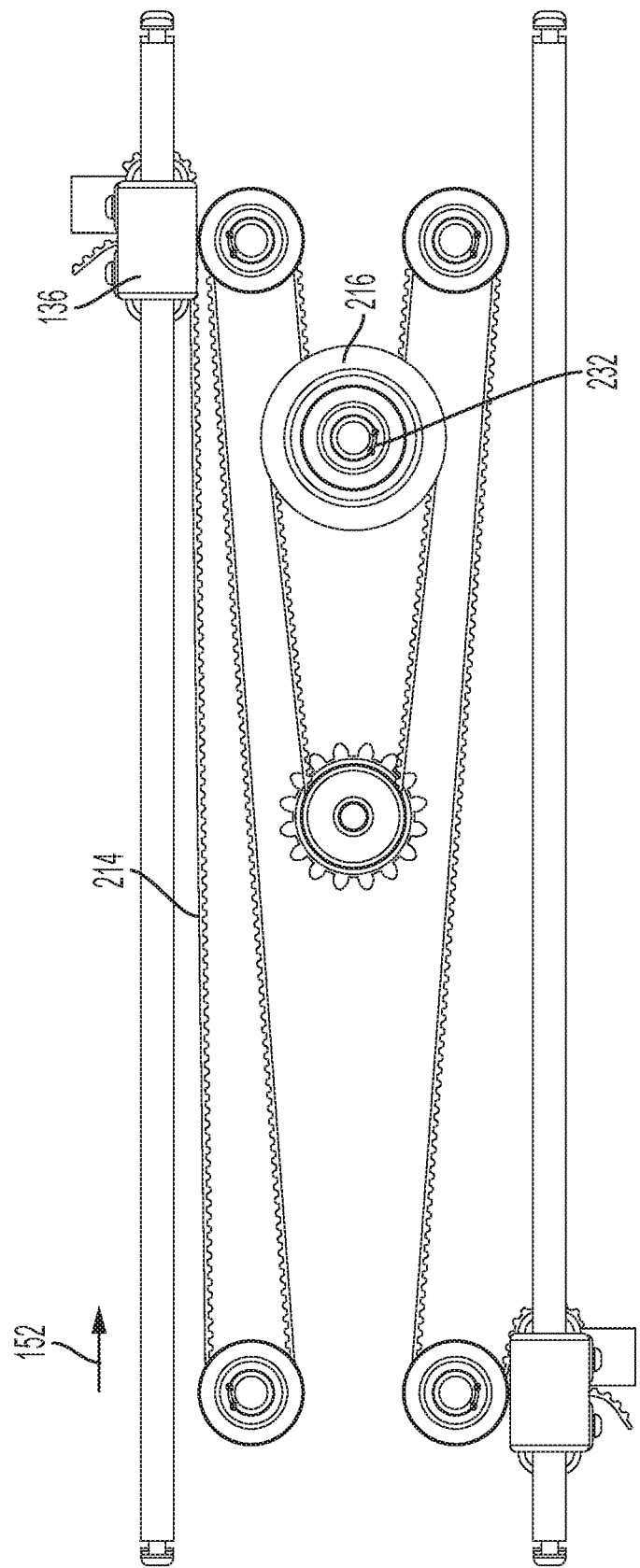
FIG. 20 is a top view of the device shown in FIG. 13 illustrating a second drive belt and a second driven belt which rotates the propeller shaft.

Conversely, when the left bracket 134 is in the retracted position and the left pedal 16 pushed in the direction of arrow 152, referring now to FIG. 20, pulley 216 is rotated in the clockwise direction, which in turn, through the driven belt 218 (see FIG. 21), the pulley 210 is rotated in the clockwise direction. As the pulley 210 which is mounted to the propeller shaft 104 with the one-way bearing rotates in the clockwise direction, its one way bearing engages and rotates the propeller shaft 104 in the clockwise direction as well. When the left bracket 136 is traversed in the direction of arrow 152, this also retracts the right foot pedal and right bracket 134 back to the retracted position. The drive belt 202 for the right foot pedal 18 and right bracket 134 rotates the pulley 204 in the counterclockwise direction. This in turn rotates the pulley 206 in the counterclockwise direction through the driven belt 208. However, because the pulley 206 is mounted to the propeller shaft with the one-way bearing and is not engaged when rotated in the counterclockwise direction, such opposite rotation of the pulleys/belt 204, 206, 208 from the pulleys/belt 216, 210, 212 is allowed.

Figure 21:
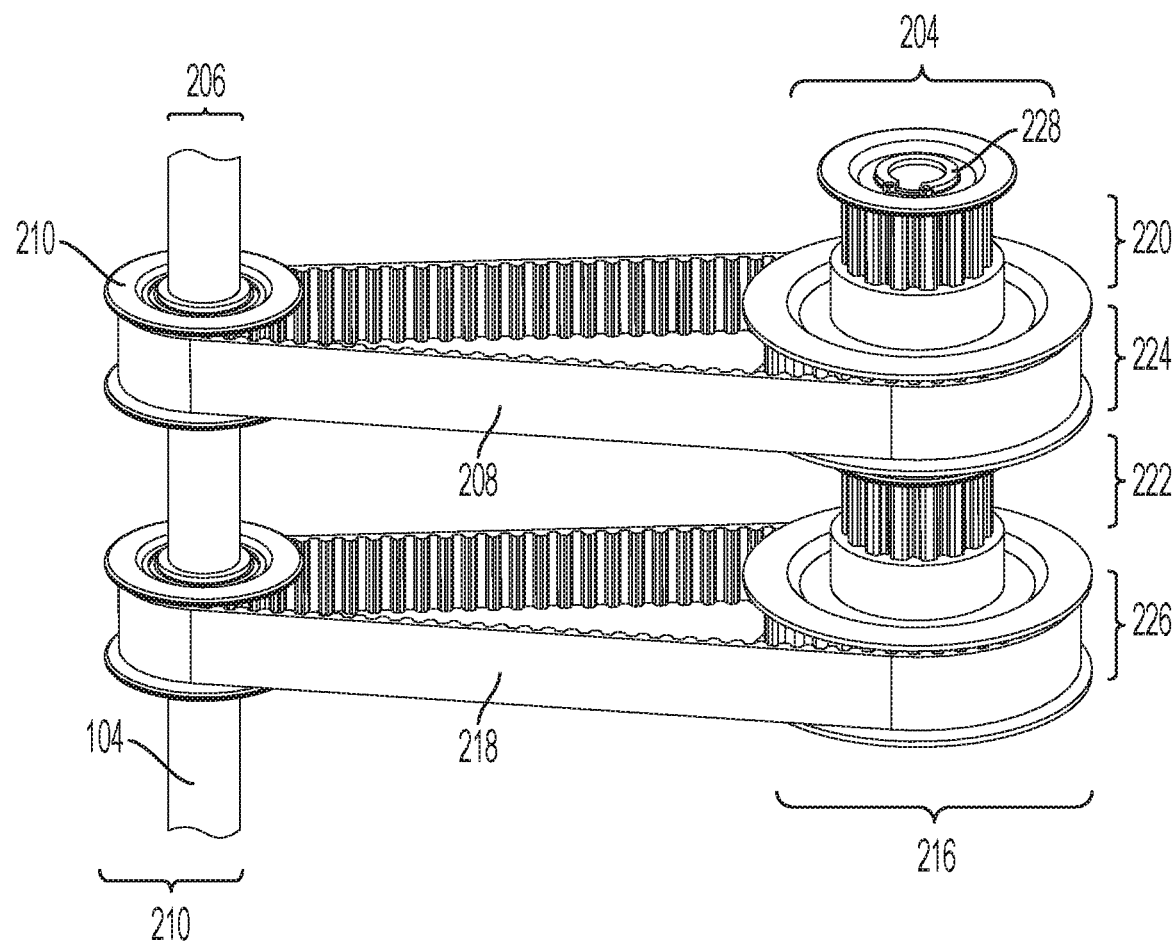
FIG. 21 illustrates a perspective view of the first and second driven belts that rotates the propeller shaft.

The following discussion is in relation to a variant of the third embodiment where a single belt is used and the one way bearings are used to mount pulleys 220, 222. Referring now to FIG. 21, it is also contemplated that the one-way bearings may in lieu of being used to mount the pulleys 206, 210 to the propeller shaft 104, be used to mount upper pulleys 220, 222 to its respective shaft 132. In this regard, the upper pulleys 220, 222 may be separated from the lower pulleys 224, 226 so that they 220, 224 and 222, 226 can rotate in opposite directions to each other. More particularly, the upper pulleys 220, 222 can rotate in opposite direction from the lower pulleys 224, 226. The pulleys 206, 210 may be pinned to the propeller shaft 104 so that rotation of the pulleys 206, 210 rotate the propeller shaft 104. Also, the lower pulleys 224, 226 may also be pinned to the shaft 132. The upper pulleys 220, 222 of the pulleys 216, 204 may be engaged to the shaft 132 with one-way bearings 228, 230 (See FIG. 21).

When the right bracket 136 is traversed in the direction of 138, the upper pulley 220 of the pulley 204 is rotated in the clockwise direction. The one-way bearing 228 is engaged and rotates the shaft 132 which in turn rotates the lower pulley 224 of the pulley 204 in the clockwise direction. The driven belt 208 rotates the pulley 206 in the clockwise direction and because the pulley 206 is pinned to the propeller shaft 104, the propeller shaft is rotated into clockwise direction. However, as discussed above, when the right bracket 136 is traversed in the direction of 138, this in turn rotates the upper pulley 222 of the pulley 216 in the counterclockwise direction. However, because the upper pulley 222 of the pulley 216 is mounted to each shaft 132 with a one-way bearing, and the one-way bearing is disengaged, the upper pulley 222 of the pulley 216 can be rotated in the clockwise direction. The upper pulley 222 of the pulley 216 does not rotate the lower pulley 226 of the pulley 216. In fact, when the propeller shaft 104 is rotated in the clockwise direction, this rotates the pulley 210 and the lower pulley 226 of the pulley 216 in the clockwise direction. The upper and lower pulleys 222, 226 of the pulley 216 are now rotated in opposite directions.

Conversely, when the left bracket 136 is in the retracted position then traversed in the direction of arrow 152 (see FIG. 20), the drive belt 214 (see FIG. 20) rotates the upper pulley 222 of the pulley 216 in the clockwise direction. Because the upper pulley 222 of the pulley 216 is rotated in the clockwise direction and the one-way bearing on the upper pulley 222 is now engaged, such rotation also rotates the shaft 132 which imparts such rotation into the lower pulley 226 of the pulley 216. Through the driven belt 218, such rotational forces is applied to the pulley 210 which is pinned to the propeller shaft 104 to rotate the propeller shaft in the clockwise direction. As discussed above, when the left bracket is traversed in the direction of arrow 152, this also rotates the upper pulley 220 of the pulley 204 in the counterclockwise direction through the drive belt 202 attached to the right bracket 136. The one-way bearing 228 of the upper pulley 220 of the pulley 204 is disengaged and does not translate such rotational movement to the lower half 224 of the pulley 204. At this moment, the upper and lower pulleys 220, 224 of the pulley 204 are rotating in the opposite directions.

Figure 19:
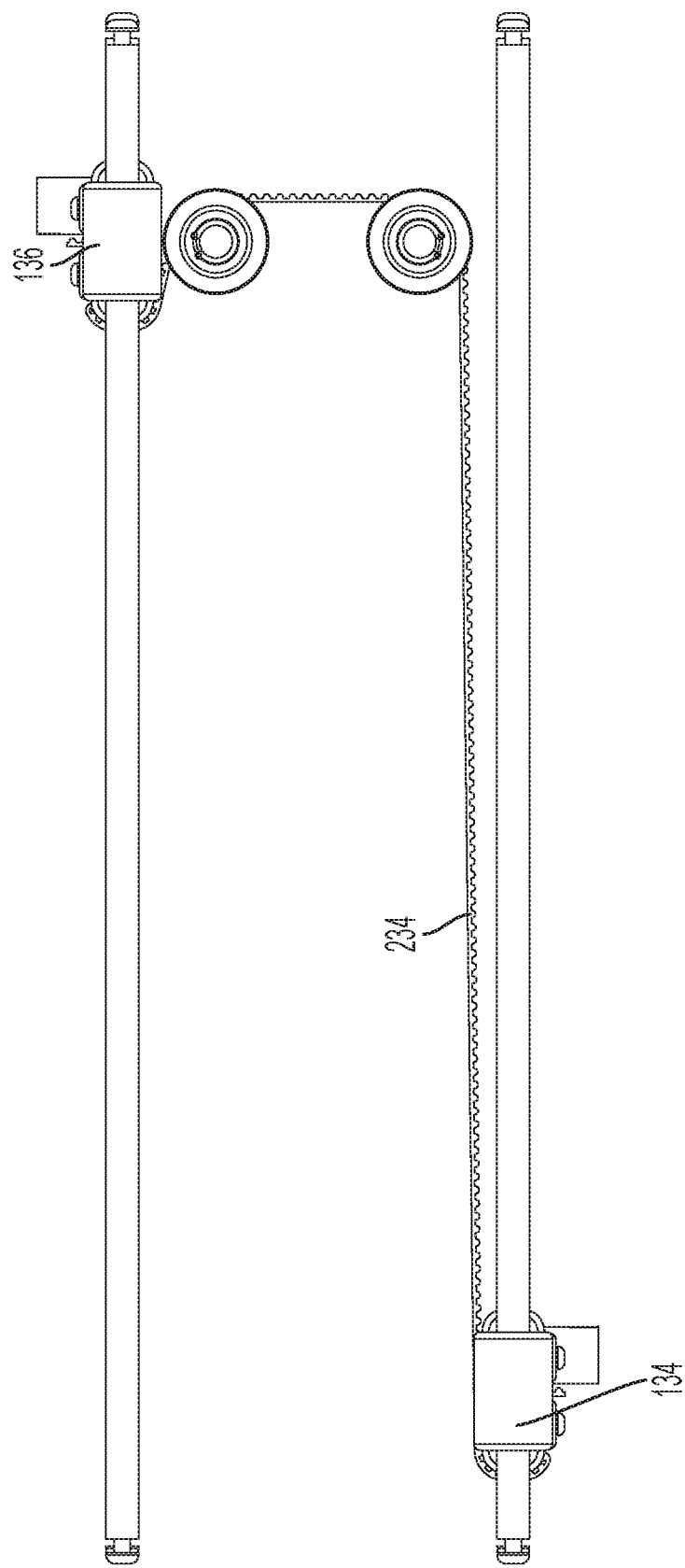
FIG. 19 is a top view of the device shown in FIG. 13 illustrating a tensioning belt.

Referring now to FIG. 19, a tensioning belt 234 is shown. The tensioning belt 234 moves the left and right brackets 134, 136 in sync with each other so that when the right bracket 134 is traversed forward, the left bracket 136 is traversed backward, and vice-versa. For example, in the position shown in FIG. 19, if the user were to pull on the left bracket 136 so that the left bracket is traversed toward the retracted position, this would move the right bracket 134 forward. When the right bracket 134 is all the way forward and the user now pulls on the right pedal 18, the tensioning belt 134 would traverse the left bracket 136 forward.

The above discussion of the various devices described the propeller shaft 104 as being rotated in a particular direction either clockwise or counterclockwise. For example, in the embodiments shown in FIGS. 5-21, the propeller shaft 104 is described as being rotated in the clockwise direction. However, the entire system can be rotated in opposite direction by flipping the direction of the one way bearing and the blades of the propeller so that a counterclockwise rotation of the propeller shaft would lead to a forward movement or forward thrust from the propeller for the water vehicle.

Figure 13:
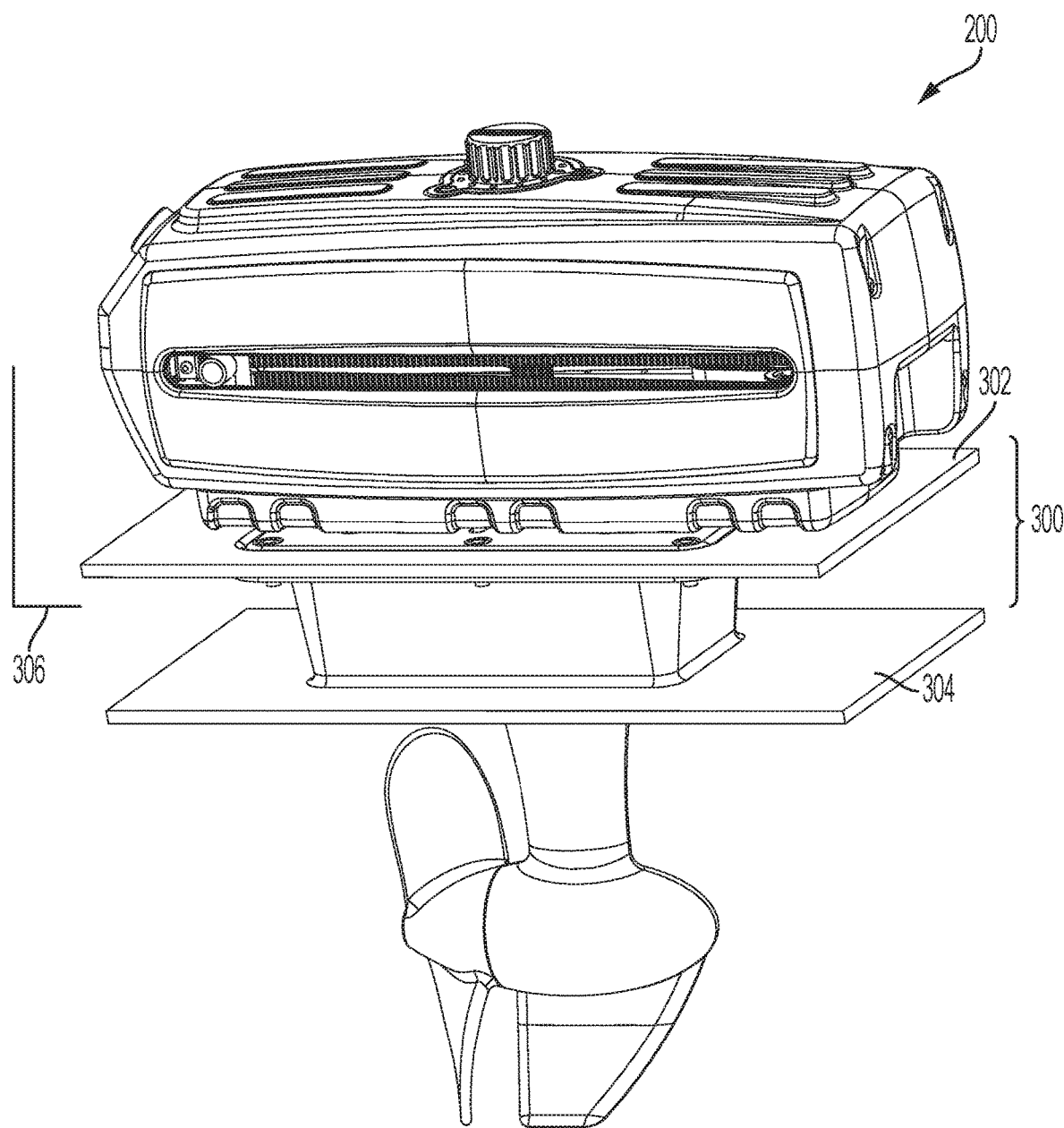
FIG. 13 is a perspective view of a third embodiment of the device.
Figure 14:
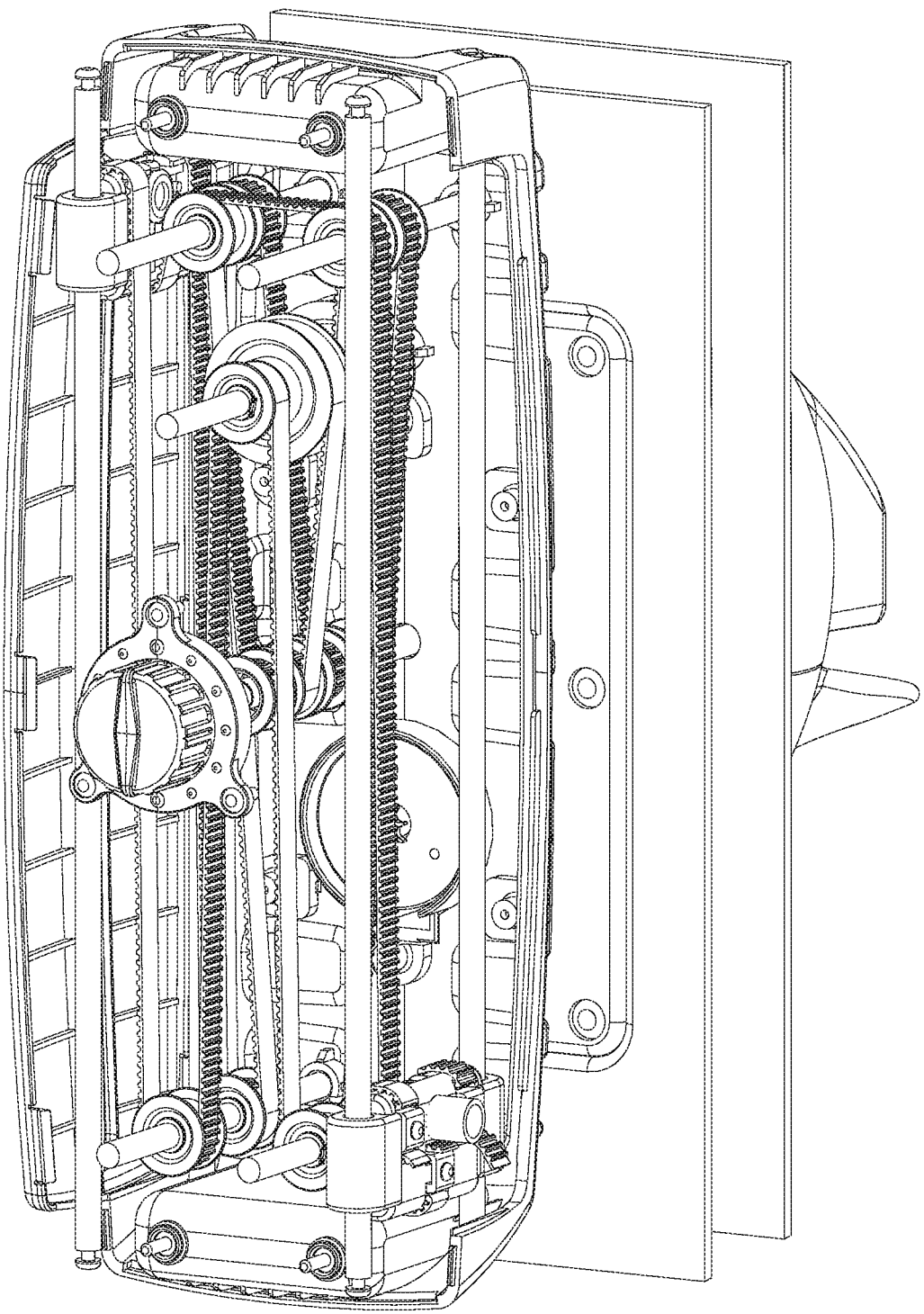
FIG. 14 is a perspective view of the device shown in FIG. 13 with a part of the housing removed therefrom.
Figure 15:
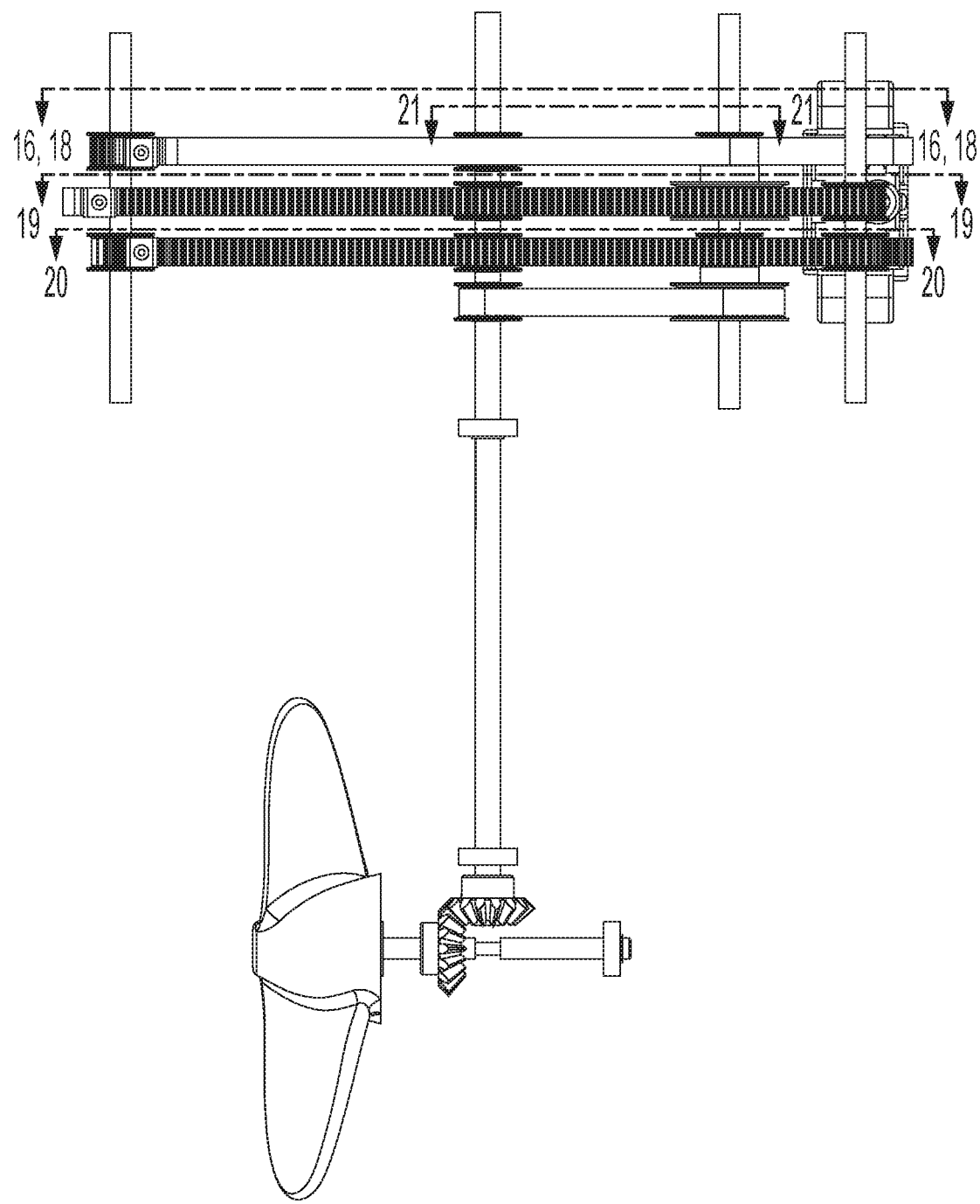
FIG. 15 is a right-side view of the device shown in FIG. 13 with the housing removed therefrom.

Moreover, as shown in FIGS. 5 and 13, the devices 100, 200 may be mounted to a hole at a hull of a water vehicle including but not limited to a watercraft, kayak or boat. The device 300 represent the hull of the water vehicle where 302 is the top hull and 304 is the bottom hull. Between the 302 and 304 may be a sealed compartment used to ensure flotation of the water vehicle on the water. A tapered hole may be constructed between 302 and 304 so the propeller can be inserted into the water. The device 300 is mounted to the water vehicle tightly with a locking mechanism attached to the top hull 302 or bottom hull 304. Additionally, the devices 10, 100, 200 are foot powered propeller. In this regard, the water vehicle may have a seat 306 both behind the device 100, 200. The user may sit on the seat 306 allowing his or her feet to reciprocally push the left and right foot pedals in order to rotate the propeller to drive the water vehicle in the forward direction.

Similar to the first embodiment, the second and third embodiments and their variants may implement a rotatable cylinder 87. The rotatable cylinder 87 may be rotated to steer the water vehicle. The propeller may provide propulsion in the direction of the propeller 360° about the output shaft. The propeller may be rotated 180° so that the water vehicle or watercraft can be propelled backwards. Moreover, it is contemplated that there may be stops placed in the system so that the propeller and a transmission box can rotate through a limited range of angles such as 90°, 70°, 60°, 50°, 45° from center. The center being a position of the propeller so that the water vehicle is propelled straightforward.

It is also contemplated that the devices 100, 200 may be mounted to a land vehicle. The propeller shaft may be considered an output shaft which is connected to an output shaft, connected to a transmission box which is connected to a drive shaft of a land vehicle or connected directly to the drive shaft of the land vehicle.

The above description is given by way of example, and not limitation. Given the above disclosure, one skilled in the art could devise variations that are within the scope and spirit of the invention disclosed herein, including various ways of Transmitting rotation of motion from one shaft to another. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A human powered vehicle operative to rotate a propeller or rotate a wheel by reciprocating first and second pedals, the vehicle comprising:
   a frame;
   a first pedal operative to reciprocate linearly or through a partial curved trajectory;
   a second pedal operative to reciprocate linearly or through a partial curved trajectory;
   a first rack attached to the first pedal so that reciprocating the first pedal reciprocates the first rack;
   a second rack attached to the second pedal so that reciprocating the second pedal reciprocates the second rack;
   a first shaft;
   a second shaft;
   a first pinion engaged to the first rack so that the first pinion reciprocates with the first rack, the first pinion attached to the first shaft;
   a second pinion engaged to the second rack so that the second pinion reciprocates with the second rack, the second pinion attached to the second shaft;
   a first beveled gear attached to the first shaft;
   a second beveled gear attached to the second shaft;
   a main shaft;
   an upper one way bearing;
   an upper beveled gear attached to the main shaft with the upper one way bearing;
   a lower one way bearing;
   a lower beveled gear attached to the main shaft with the lower one way bearing;
   a transmission box attached to the frame, the transmission box having an input shaft and an output shaft, the input shaft operative to rotate the output shaft, the main shaft being coupled to the input shaft; and the propeller or the wheel attached to the output shaft.

2. The human powered vehicle of claim 1 wherein the upper and lower one way bearings are attached to the main shaft and engaged to the main shaft in the same rotational direction and freely rotate in the opposite rotational direction.

3. The human powered vehicle of claim 1 wherein the propeller and not the wheel is attached to the output shaft.

4. The human powered vehicle of claim 1 wherein the wheel and not the propeller is attached to the output shaft.

5. The human powered vehicle of claim 1 wherein the first and second racks are straight.

6. The human powered vehicle of claim 1 wherein the first and second racks are rotationally attached to the frame.

7. A human powered vehicle operative to spin a propeller or rotate a wheel by reciprocating first and second pedals, the vehicle comprising:
- a frame of the human powered vehicle;
- a main shaft;
- a first pedal operative to reciprocate linearly or through a partial curved trajectory and impart rotation to the main shaft;
- a second pedal operative to reciprocate linearly or through a partial curved trajectory and impart rotation to the main shaft;
- a first one way bearing or pulley mounted to the main shaft, the first one way bearing or pulley allowing for free rotation in a second rotational direction but not in a first rotational direction;
- a second one way bearing or pulley mounted to the main shaft, the second one way bearing or pulley allowing for free rotation in the second rotational direction but not in the first rotational direction;
- a transmission box attached to the frame, the transmission box having an input shaft and an output shaft, the input shaft operative to rotate the output shaft, the main shaft being coupled to the input shaft;
- the propeller or the wheel attached to the output shaft of the transmission box.

8. The human powered vehicle of claim 7 wherein the linear reciprocation of the first and second pedals may be straight or curved and is not circular 360°.

9. The vehicle of claim 7 wherein the frame is a land vehicle frame.

10. The vehicle of claim 7 wherein the frame is a human powered watercraft frame.

11. A method for propelling a small human powered vehicle, the method comprising the steps of:
- pushing a first pedal forward but not in a circular motion to rotate a first one way bearing or pulley attached to an output shaft in a first rotational direction;
- actively engaging the output shaft with the first one way bearing, the first one way bearing allowing for free rotation in a second opposite rotational direction but not in the first rotational direction;
- rotating the output shaft with the first one way bearing during the pushing the first pedal step;
- pushing a second pedal forward but not in a circular motion to rotate a second one way bearing or pulley attached to the output shaft in the first rotational direction;
- actively engaging the output shaft with the second one way bearing, the second one way bearing allowing for free rotation in the second opposite rotational direction but not in the first rotational direction;
- rotating the output shaft with the second one way bearing during the pushing the second pedal step;
- imparting rotational energy to a propeller or a wheel when the first pedal is pushed forward and when the second pedal is pushed forward.

12. The method of claim 11 wherein the human powered vehicle is a watercraft and the propeller is rotated upon pushing the first and second pedals forward.

13. The method of claim 11 wherein the human powered vehicle is a land vehicle and the wheel is rotated upon pushing the first and second pedals forward.

14. The human powered vehicle of claim 11 wherein the propeller and not the wheel is attached to the output shaft.

15. The human powered vehicle of claim 11 wherein the wheel and not the propeller is attached to the output shaft.

16. The human powered vehicle of claim 11 wherein the pushing movement of the first and second pedals is straight or curved but not circular.

17. The human powered vehicle of claim 7 wherein the propeller and not the wheel is attached to the output shaft.

18. The human powered vehicle of claim 7 wherein the wheel and not the propeller is attached to the output shaft.

* * * * *